US012659505B2

(12) United States Patent     (10) Patent No.:   US 12,659,505 B2

Chen et al.     (45) Date of Patent:    Jun. 16, 2026

(54) TEMPLATE-MATCHING BASED MOTION SHIFT REFINEMENT FOR SUBBLOCK BASED MOTION VECTOR (MV) PREDICTOR

(71) Applicant: Tencent America LLC, Palo Alto, CA (US)

(72) Inventors: Lien-Fei Chen, Palo Alto, CA (US); Guichun Li, San Jose, CA (US); Xin Zhao, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 24 days.

(21) Appl. No.: 18/962,820

(22) Filed: Nov. 27, 2024

(65) Prior Publication Data

US 2025/0097454 A1     Mar. 20, 2025

Related U.S. Application Data

(63) Continuation of application No. 17/984,850, filed on Nov. 10, 2022, now Pat. No. 12,192,509.

(Continued)

(51) Int. Cl.
    *H04N 19/52*        (2014.01)
    *H04N 19/105*      (2014.01)
    (Continued)

(52) U.S. Cl.
    CPC ........... *H04N 19/52* (2014.11); *H04N 19/105* (2014.11); *H04N 19/109* (2014.11);
    (Continued)

(58) Field of Classification Search
None
See application file for complete search history.

(56) References Cited

U.S. PATENT DOCUMENTS

2013/0242046 A1    9/2013   Zhang et al.
2019/0110058 A1    4/2019   Chien et al.
              (Continued)

OTHER PUBLICATIONS

H. Yang, H. Chen, J. Chen, S. Esenlik, S. Sethuraman, X. Xiu, E. Alshina, and J. Luo, "Subblock-Based Motion Derivation and Inter Prediction Refinement in Versatile Video Coding Standard", IEEE Trans. Circuits Syst. Video Technol., vol. 31, No. 10, pp. 3862-3877, Oct. 2021.

(Continued)

*Primary Examiner* — Clifford Hilaire

(74) *Attorney, Agent, or Firm* — ArentFox Schiff LLP

(57)          ABSTRACT

Aspects of the disclosure provide a method and an apparatus including processing circuitry that decodes a current block in a current picture with a subblock-based temporal motion vector prediction (SbTMVP) mode. A first collocated block in a first collocated picture is determined based on a first displacement vector candidate of the current block corresponding to a first SbTMVP candidate. The processing circuitry determines first motion information of a current template of the current block based on one or more pieces of motion information of the first collocated block or a neighboring block of the first collocated block. The processing circuitry determines one of a first reference template and a first subblock reference template in a first reference picture based on the first motion information and determines a first template matching cost based on the current template and the one of the first reference template and the first subblock reference template.

20 Claims, 28 Drawing Sheets

Related U.S. Application Data

(60) Provisional application No. 63/388,109, filed on Jul. 11, 2022.

(51) Int. Cl.
|  |  |
|---|---|
| *H04N 19/109* | (2014.01) |
| *H04N 19/139* | (2014.01) |
| *H04N 19/159* | (2014.01) |
| *H04N 19/167* | (2014.01) |
| *H04N 19/172* | (2014.01) |
| *H04N 19/176* | (2014.01) |
| *H04N 19/43* | (2014.01) |
| *H04N 19/88* | (2014.01) |

(52) U.S. Cl.
CPC ......... *H04N 19/139* (2014.11); *H04N 19/159* (2014.11); *H04N 19/167* (2014.11); *H04N 19/172* (2014.11); *H04N 19/176* (2014.11); *H04N 19/43* (2014.11); *H04N 19/88* (2014.11)

(56) References Cited

U.S. PATENT DOCUMENTS

| | | |
|---|---|---|
| 2019/0297339 A1 | 9/2019 | Hannuksela et al. |
| 2020/0128258 A1 | 4/2020 | Chen et al. |
| 2021/0314596 A1 | 10/2021 | Wang et al. |
| 2022/0417500 A1 | 12/2022 | Huang et al. |

OTHER PUBLICATIONS

High Efficiency Video Coding, Rec. ITU-T H.265 v4 Dec. 2016, pp. 1-664.

M. Caban, et al., "Algorithm description of Enhanced Compression Model 4 (ECM 4)", JVET-Y2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-32.

ITU-T and ISO/IEC, "Versatile Video Coding", ITU-T Rec. H.266 and ISO/IEC 23090-3, 2020, pp. 1-516.

L. Zhao, K. Zhang, and L. Zhang, "Non-EE2: Enhanced temporal motion information derivation," ISO/IEC JTC1/SC29/ WG5 JVET-AA0141, Jul. 2022, pp. 1-3.

U.S. Appl. No. 17/984,850, filed Nov. 10, 2022.

0: PLANAR MODE
1: DC MODE

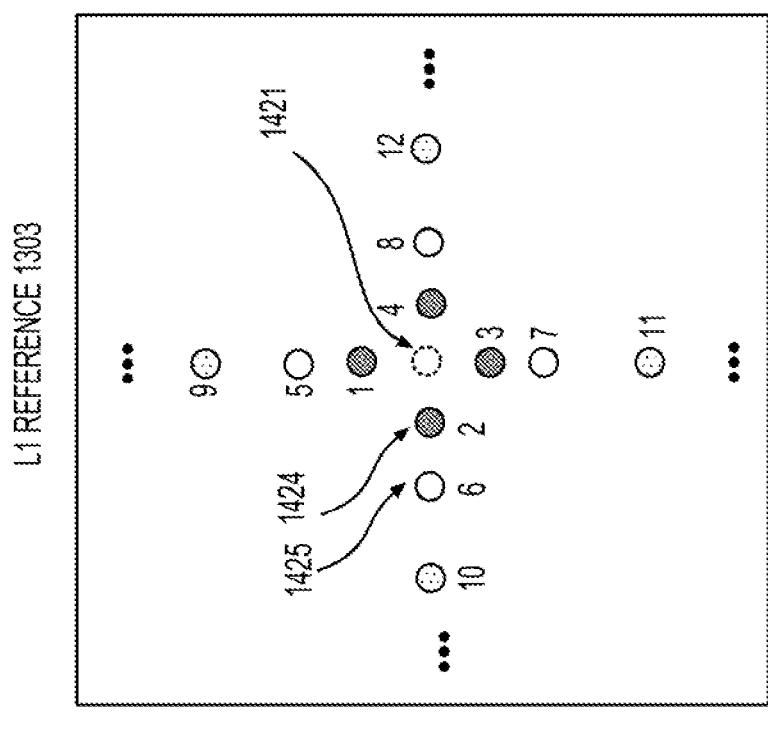
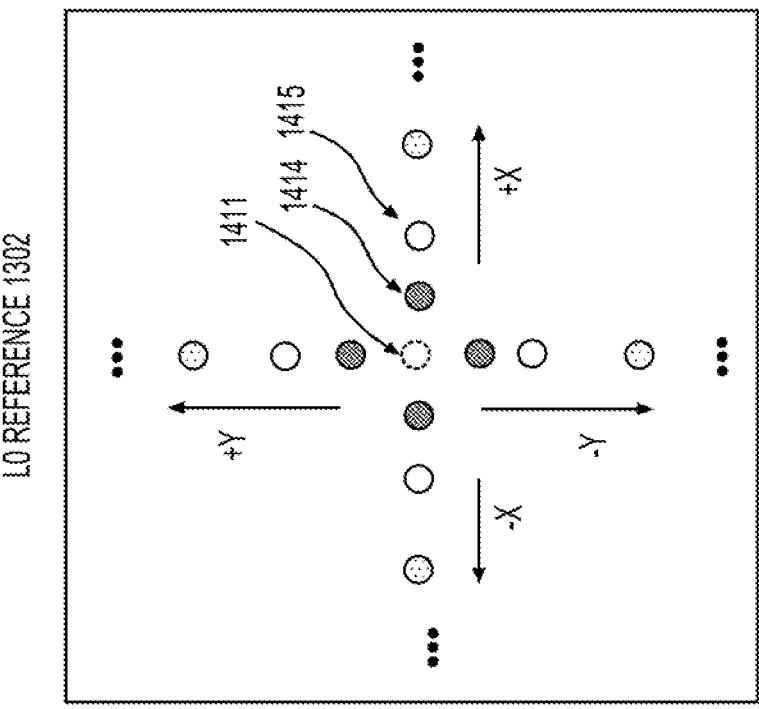
FIG. 14

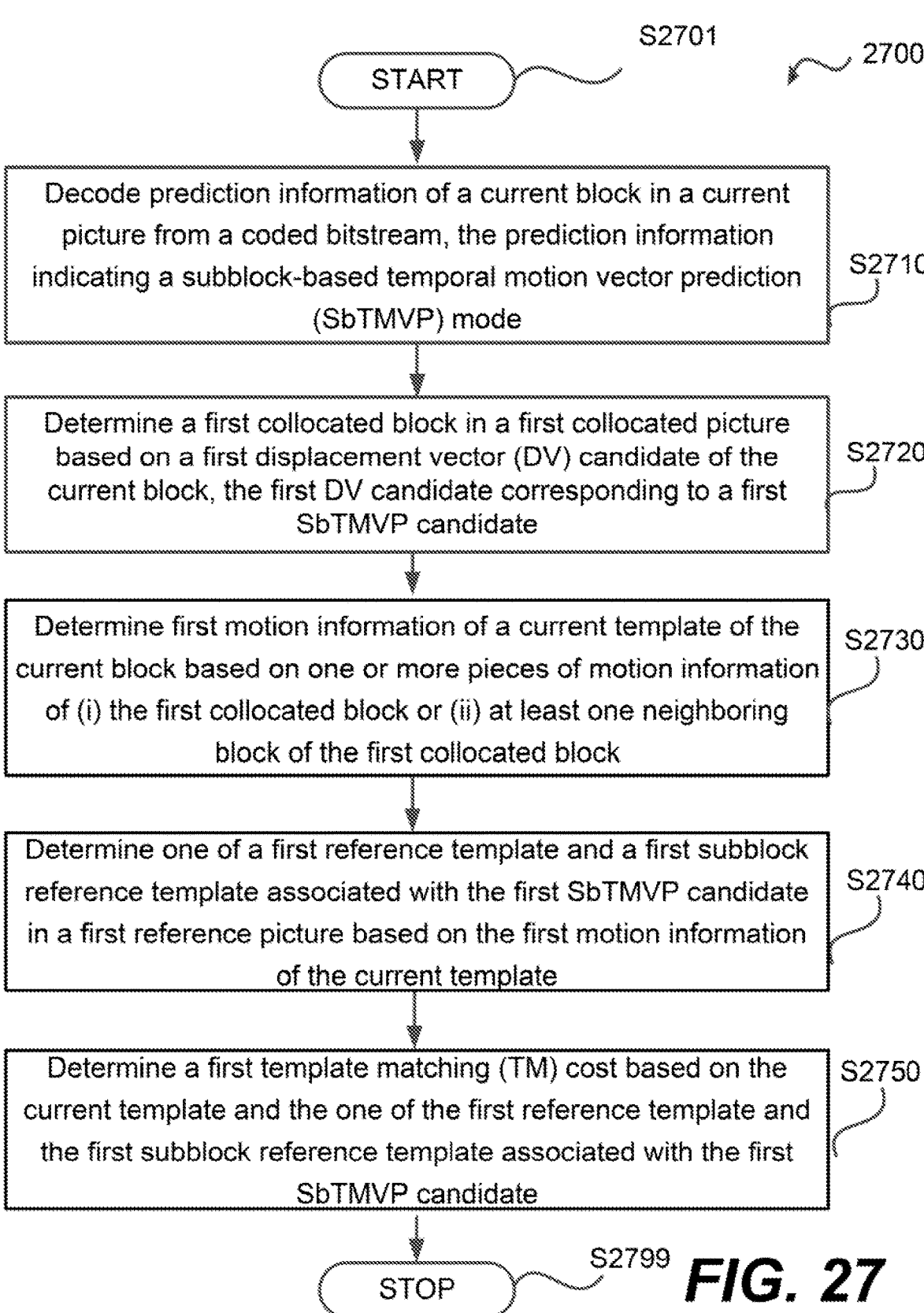

S2701

2700

START

Decode prediction information of a current block in a current picture from a coded bitstream, the prediction information indicating a subblock-based temporal motion vector prediction (SbTMVP) mode

S2710

Determine a first collocated block in a first collocated picture based on a first displacement vector (DV) candidate of the current block, the first DV candidate corresponding to a first SbTMVP candidate

S2720

Determine first motion information of a current template of the current block based on one or more pieces of motion information of (i) the first collocated block or (ii) at least one neighboring block of the first collocated block

S2730

Determine one of a first reference template and a first subblock reference template associated with the first SbTMVP candidate in a first reference picture based on the first motion information of the current template

S2740

Determine a first template matching (TM) cost based on the current template and the one of the first reference template and the first subblock reference template associated with the first SbTMVP candidate

S2750

STOP

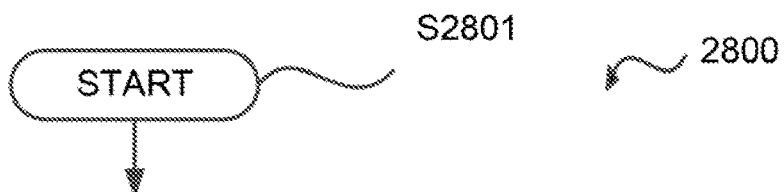

2800

START

Decode prediction information of a current block in a current picture from a coded video bitstream, the prediction information indicating an inter prediction and a plurality of collocated pictures for the current block

S2810

For each motion information candidate of a plurality of candidates of the current block, determine whether a reference picture of the motion information candidate is a respective one of the plurality of collocated pictures

S2820

For each motion information candidate of the plurality of candidates of the current block, in response to the reference picture of the motion information candidate being the one of the plurality of collocated pictures, determine a collocated block in the one of the plurality of collocated pictures based on the motion information candidate of the current block and determine at least one temporal motion vector prediction (TMVP) candidate based on motion information of (i) the collocated block or (ii) a neighboring block of the collocated block, the motion information including one motion vector (MV) for uni-prediction and two MVs for bi-prediction, a candidate list for the current block being constructed based on the at least one TMVP candidate

S2830

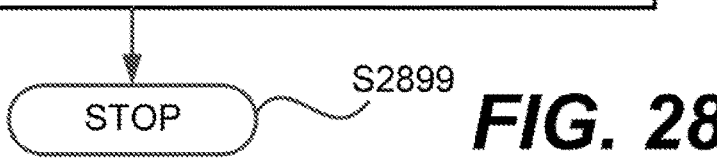

S2899

STOP

*FIG. 28*

TEMPLATE-MATCHING BASED MOTION SHIFT REFINEMENT FOR SUBBLOCK BASED MOTION VECTOR (MV) PREDICTOR

INCORPORATION BY REFERENCE

The present application is a continuation of U.S. application Ser. No. 17/984,850, "PARTITION, MOTION VECTOR (MV) DERIVATION OF TEMPLATE-MATCHING, AND SUBBLOCK MV DERIVATION FOR SUBBLOCK BASED MV PREDICTOR," filed on Nov. 10, 2022, which claims the benefit of priority to U.S. Provisional Application No. 63/388,109, "PARTITION AND MOTION VECTOR DERIVATION OF TEMPLATE-MATCHING AND SUB-BLOCK MV DERIVATION FROM MULTIPLE COLLO-CATED REFERENCE FRAME FOR SUBBLOCK BASED MOTION VECTOR PREDICTOR" filed on Jul. 11, 2022, which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video and/or image encoding/decoding. In some examples, an apparatus for video/image decoding includes processing circuitry. The processing circuitry decodes prediction information of a current block in a current picture from a coded video/image bitstream. The prediction information indicates a subblock-based temporal motion vector prediction (SbTMVP) mode. The processing circuitry determines a first collocated block in a first collocated picture based on a first displacement vector (DV) candidate of the current block. The first DV candidate corresponds to a first SbTMVP candidate. The processing circuitry determines first motion information of a current template of the current block based on one or more pieces of motion information of (i) the first collocated block or (ii) at least one neighboring block of the first collocated block. The processing circuitry determines one of a first reference template and a first subblock reference template associated with the first SbTMVP candidate in a first reference picture based on the first motion information of the current template and determines a first template matching (TM) cost based on the current template and the one of the first reference template and the first subblock reference template associated with the first SbTMVP candidate. The first reference template and the current template can have a same size. A size of the first subblock reference template can be less than a size of the current template.

In an embodiment, DV candidates of the current block include the first DV candidate. The processing circuitry can perform a TM process as below. For each of the DV candidates that is different from the first DV candidate, the processing circuitry determines a collocated block in one of at least one collocated picture based on the respective DV candidate of the current block. The at least one collocated picture includes the first collocated picture. The processing circuitry determines motion information of the current template based on one or more pieces of motion information of (i) the collocated block associated with the respective DV candidate or (ii) at least one neighboring block of the collocated block associated with the respective DV candidate. The processing circuitry determines one of a reference template associated and a subblock reference template with the respective DV candidate in the first reference picture based on the motion information of the current template and determines a TM cost based on the current template and the one of the first reference template and the subblock reference template associated with the respective DV candidate. The reference template associated with the respective DV candidate and the current template can have a same size. A size of the subblock reference template can be less than the size of the current template. The processing circuitry determines a SbTMVP candidate based on the TM costs that include the first TM cost. The processing circuitry reconstructs the current block based on the determined SbTMVP candidate.

In an example, the one of the first reference template and the first subblock reference template is the first reference template. The processing circuitry determines the first motion information of the current template as motion information of a center position of the first collocated block and determines the first reference template associated with the first DV candidate based on the motion information of the center position of the first collocated block.

In an embodiment, the one of the first reference template and the first subblock reference template is the first subblock reference template. The current template includes a first subblock template and a second subblock template. The first motion information of the current template includes a first piece of motion information of the first subblock template and a second piece of motion information of the second subblock template that is different from the first piece of motion information. The processing circuitry determines the first piece of motion information of the first subblock template from a first subblock and determines the second piece of motion information of the second subblock template from a second subblock. The first subblock and the second subblock are different subblocks in (i) the first collocated block or (ii) the at least one neighboring block of the first collocated block. The processing circuitry determines the first subblock reference template based on the first piece of motion information of the first subblock template. The processing circuitry determines a second subblock reference template based on the second piece of motion information of the second subblock template. The second subblock reference template can be in one of the first reference picture and in a second reference picture. The processing circuitry determine a predictor template based on the first subblock reference template and the second subblock reference template determines the TM cost based on the current template and the predictor template.

In an embodiment, the processing circuitry determines the first piece of motion information of the first subblock template based on motion information of a subblock in the first collocated block. The subblock in the first collocated block is collocated with a subblock in the current block that is adjacent to the first subblock template.

In an embodiment, the processing circuitry determines the first piece of motion information of the first subblock template based on motion information of a subblock in the at least one neighboring block of the first collocated block. The subblock in the at least one neighboring block of the first collocated block is collocated with the first subblock template.

In an embodiment, the first subblock template is bi-predicted and the second subblock template is uni-predicted. The first piece of motion information of the first subblock template includes a motion vector (MV) pointing to the first subblock reference template in the first reference picture and another MV pointing to a first subblock reference template in a second reference picture. The second piece of motion information of the second subblock template includes a MV pointing to the second subblock reference template in the first reference picture. The the processing circuitry determines determines a first predictor subblock template based on the first subblock reference template in the first reference picture and the first subblock reference template in the second reference picture. The processing circuitry determines a second predictor subblock template based on the second subblock reference template in the first reference picture.

In an embodiment, the processing circuitry determines the predictor template based on the first predictor subblock template and the second predictor subblock template.

In an embodiment, the processing circuitry determines a first sub-TM cost based on the first subblock template and the first predictor subblock template. The processing circuitry determines a second sub-TM cost based on the second subblock template and the second predictor subblock template and determines the first TM cost based on the first sub-TM cost and the second sub-TM cost.

In an embodiment, the processing circuitry determines the first TM cost based on the first sub-TM cost, the second sub-TM cost, and at least one of (i) a first bias factor that modifies the first sub-TM cost or (ii) a second bias factor that modifies the second sub-TM.

In an example, in response to the first subblock template being above the current block and a width of the first subblock template being a multiple of a width of a subblock in the first collocated block, the processing circuitry determines the first piece of motion information of the first subblock template based on motion information of subblocks in a top row in the first collocated block or subblocks that are above the first collocated block. In response to the first subblock template being a left neighbor of the current block and a height of the first subblock template being a multiple of a height of the subblock in the first collocated block, the processing circuitry determines the first piece of motion information of the first subblock template based on motion information of subblocks in a left most column in the first collocated block or subblocks that are left neighbors of the first collocated block.

In an example, a respective one of the DV candidates of the current block corresponds to each of SbTMVP candidates of the current block. The SbTMVP candidates include the first SbTMVP candidate. The processing circuitry reorders the SbTMVP candidates based on the corresponding TM costs and selects the SbTMVP candidate from the reordered SbTMVP candidates.

In an example, the DV candidates include at least one of (i) DV predictors of the current block or (ii) summations of respective DV offsets and one of the DV predictors. The processing circuitry selects the SbTMVP candidate based on an index signaled in the coded video/image bitstream.

In an example, the processing circuitry selects the SbTMVP candidate as one of the reordered SbTMVP candidates that corresponds to the smallest TM cost in the TM costs.

In an embodiment, subblock-based merge candidates include the first SbTMVP candidate and at least one affine merge candidate. The TM process includes (i) determining at least one TM cost of the at least one affine merge candidate, (ii) reordering the subblock-based merge candidates based on the first TM cost of the first SbTMVP candidate and the at least one TM cost of the at least one affine merge candidate, and (iii) selecting a subblock-based merge candidate from the reordered subblock-based merge candidates. The selected subblock-based merge candidate can be used to reconstruct the current block.

In an example, the at least one collocated picture includes a plurality of collocated pictures and a reference picture of each of the DV candidates is one of the plurality of collocated pictures.

In an example, the processing circuitry determines the DV candidates based on a set of predefined candidates including at least one of (i) a motion vector (MV) of a spatial neighboring block of the current block, (ii) an MV of a spatial neighboring subblock of the current block, (iii) a history-based MV predictor (HMVP), or (iv) a candidate in a merge candidate list that includes at least one of (a) a spatial candidate, (b) a temporal candidate, (c) a HMVP candidate, (d) a pairwise average candidate, or (e) a zero MV.

In an example, the processing circuitry reorders the DV candidates based on the corresponding TM costs and determines the SbTMVP candidate based on one of the reordered DV candidates that corresponds to the smallest TM cost in the TM costs.

In an embodiment, processing circuitry of an apparatus for video/image coding decodes prediction information of a current block in a current picture from a coded video/image bitstream. The prediction information indicates an inter prediction and a plurality of collocated pictures for the current block. For each motion information candidate of a plurality of candidates of the current block, the processing circuitry determines whether a reference picture of the motion information candidate is a respective one of the plurality of collocated pictures. In response to the reference picture of the motion information candidate being the one of the plurality of collocated pictures, the processing circuitry determines a collocated block in the one of the plurality of collocated pictures based on the motion information candidate of the current block. The processing circuitry determines at least one temporal motion vector prediction (TMVP) candidate based on motion information of (i) the collocated block or (ii) a neighboring block of the collocated block. The motion information includes one motion vector (MV) for uni-prediction and two MVs for bi-prediction. A candidate list for the current block can be constructed based on the at least one TMVP candidate.

Aspects of the disclosure also provide a non-transitory computer-readable medium storing instructions which when executed by a computer cause the computer to perform the methods for video and/or image encoding/decoding.

BRIEF DESCRIPTION OF THE DRAWINGS

Further features, the nature, and various advantages of the disclosed subject matter will be more apparent from the following detailed description and the accompanying drawings in which:

FIGS. 13-14 show an example of a search process in a merge motion vector difference (MMVD) mode.

FIG. 27 shows a flow chart outlining a decoding process according to some embodiment of the disclosure.

FIG. 28 shows a flow chart outlining a decoding process according to some embodiment of the disclosure.

DETAILED DESCRIPTION OF EMBODIMENTS

Figure 1A:
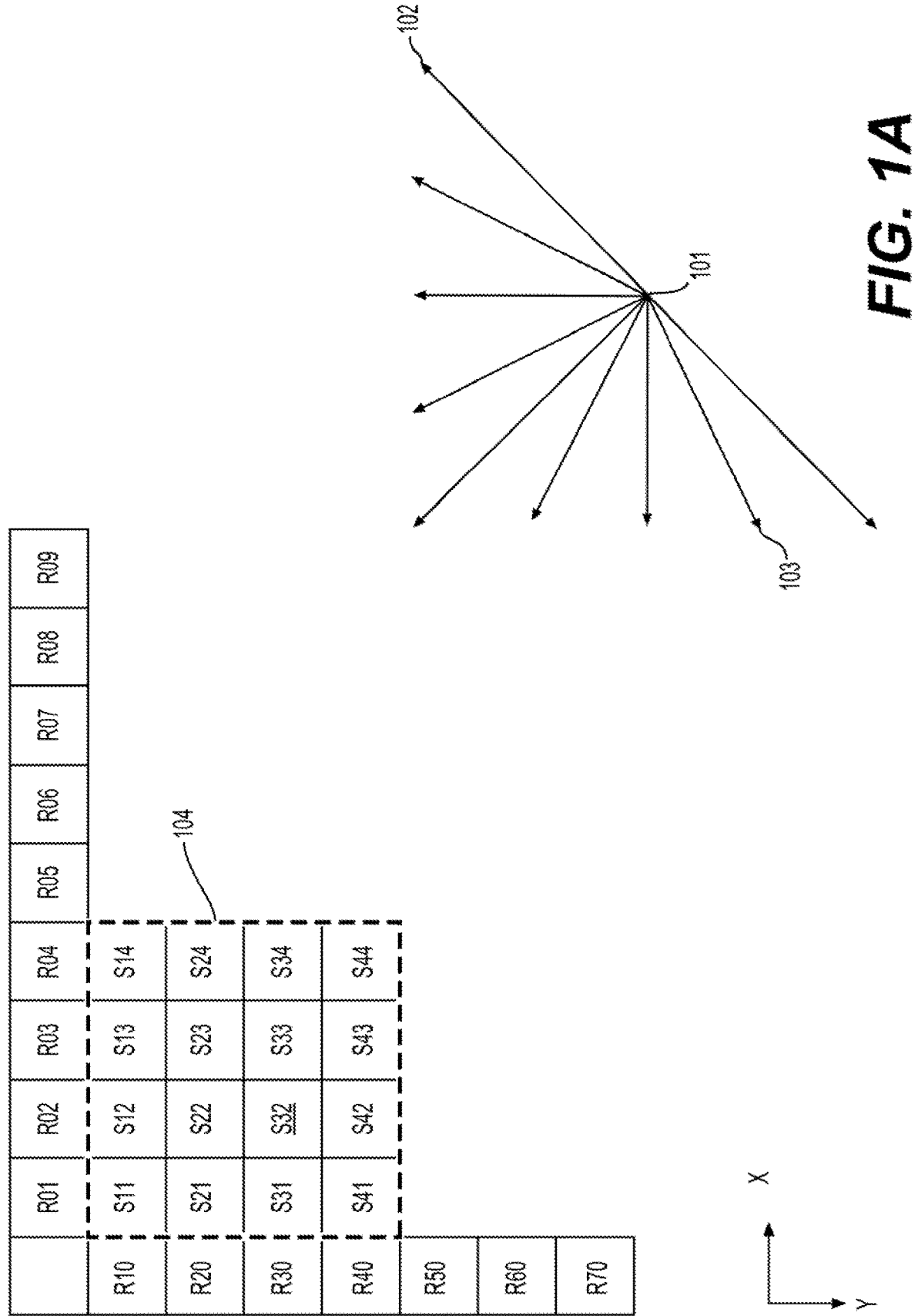
FIG. 1A is a schematic illustration of an exemplary subset of intra prediction modes.
Figure 1B:
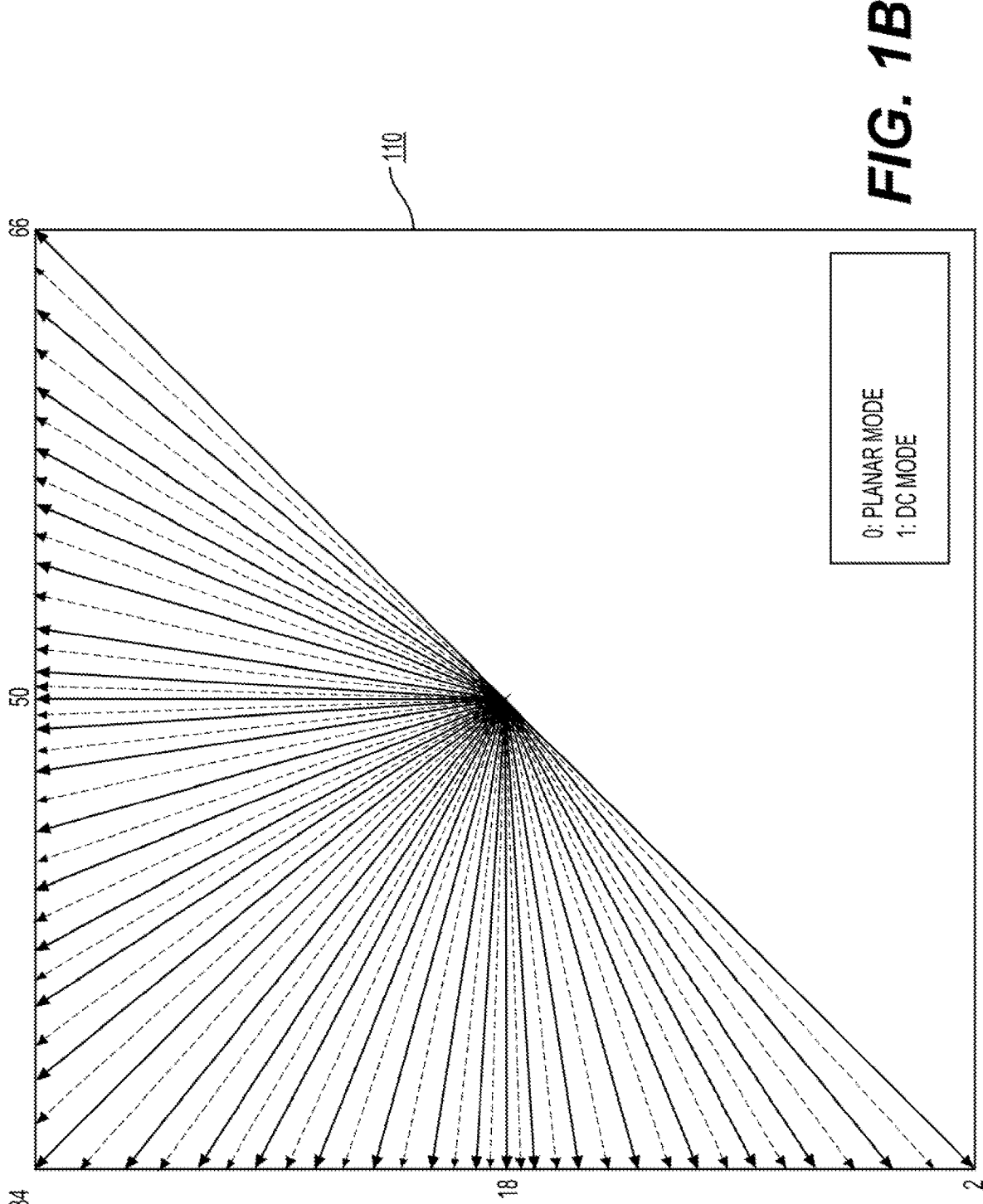
FIG. 1B is an illustration of exemplary intra prediction directions.
Figure 2:
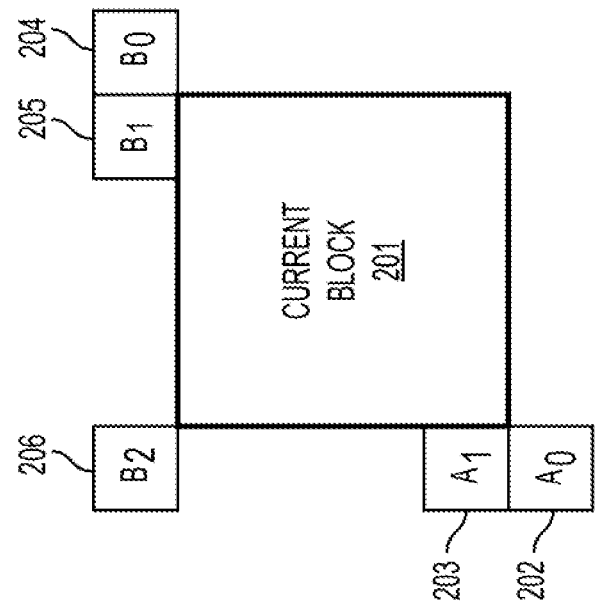
FIG. 2 shows an example of a current block (201) and surrounding samples.
Figure 3:
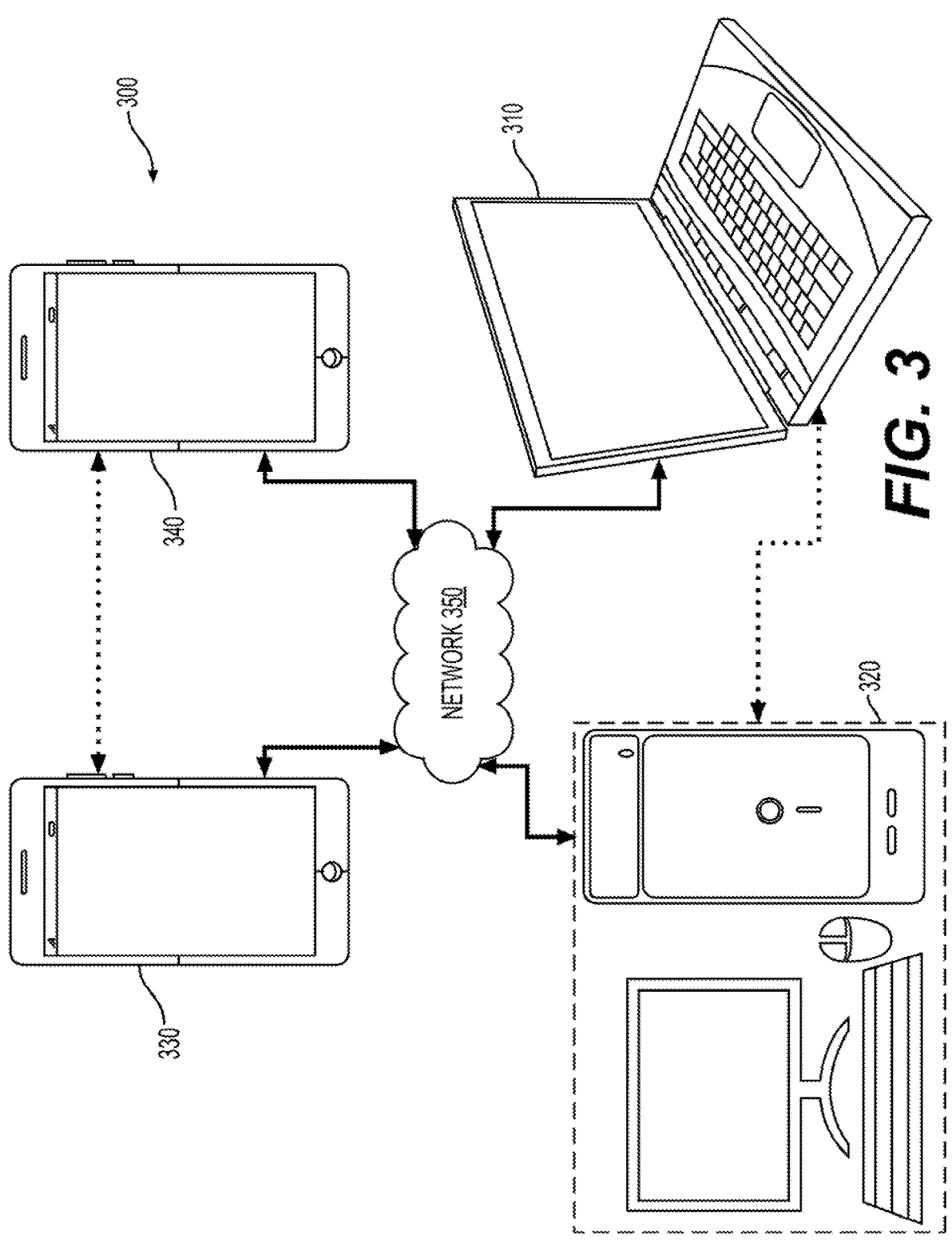
FIG. 3 is a schematic illustration of an exemplary block diagram of a communication system (300).

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
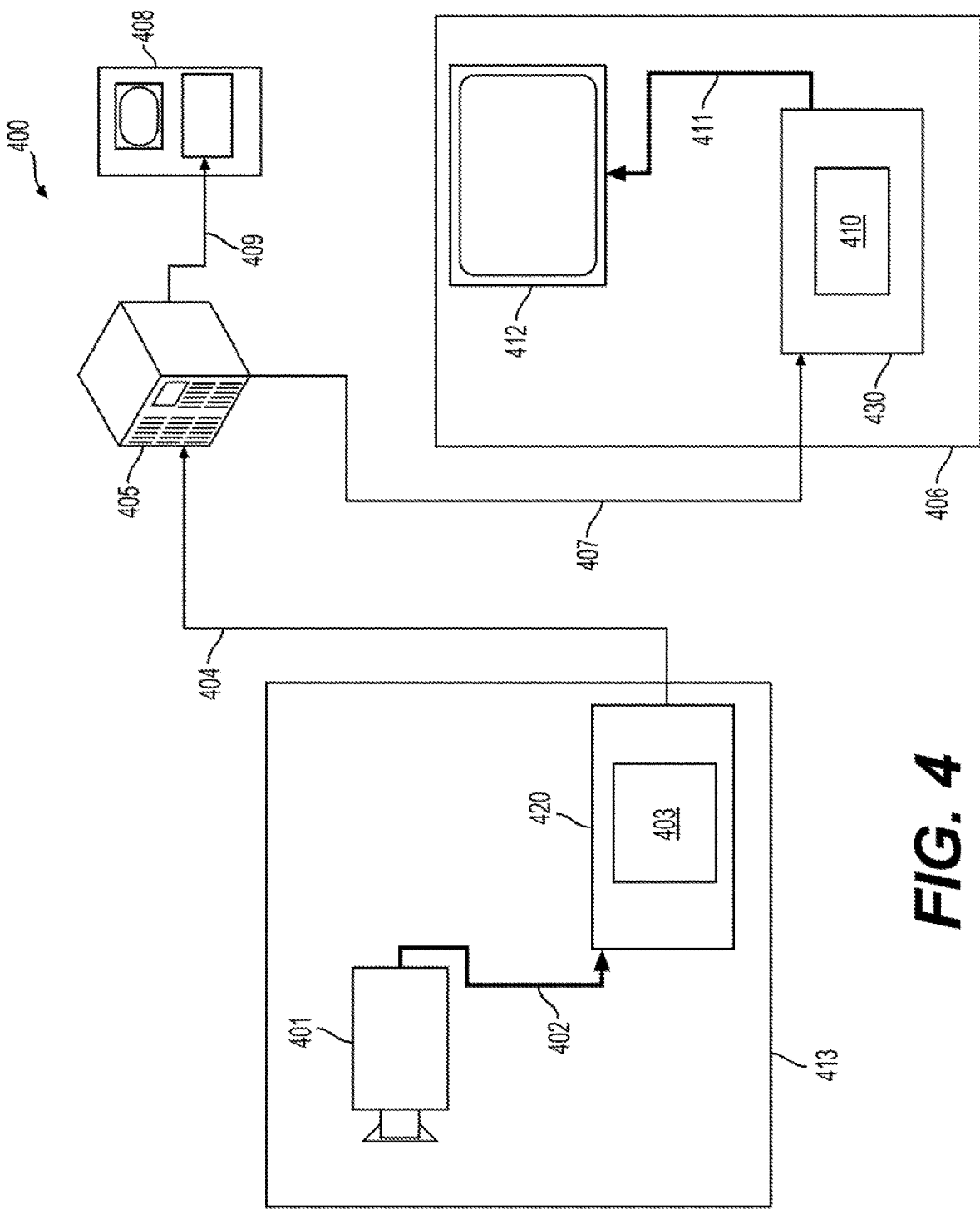
FIG. 4 is a schematic illustration of an exemplary block diagram of a communication system (400).

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
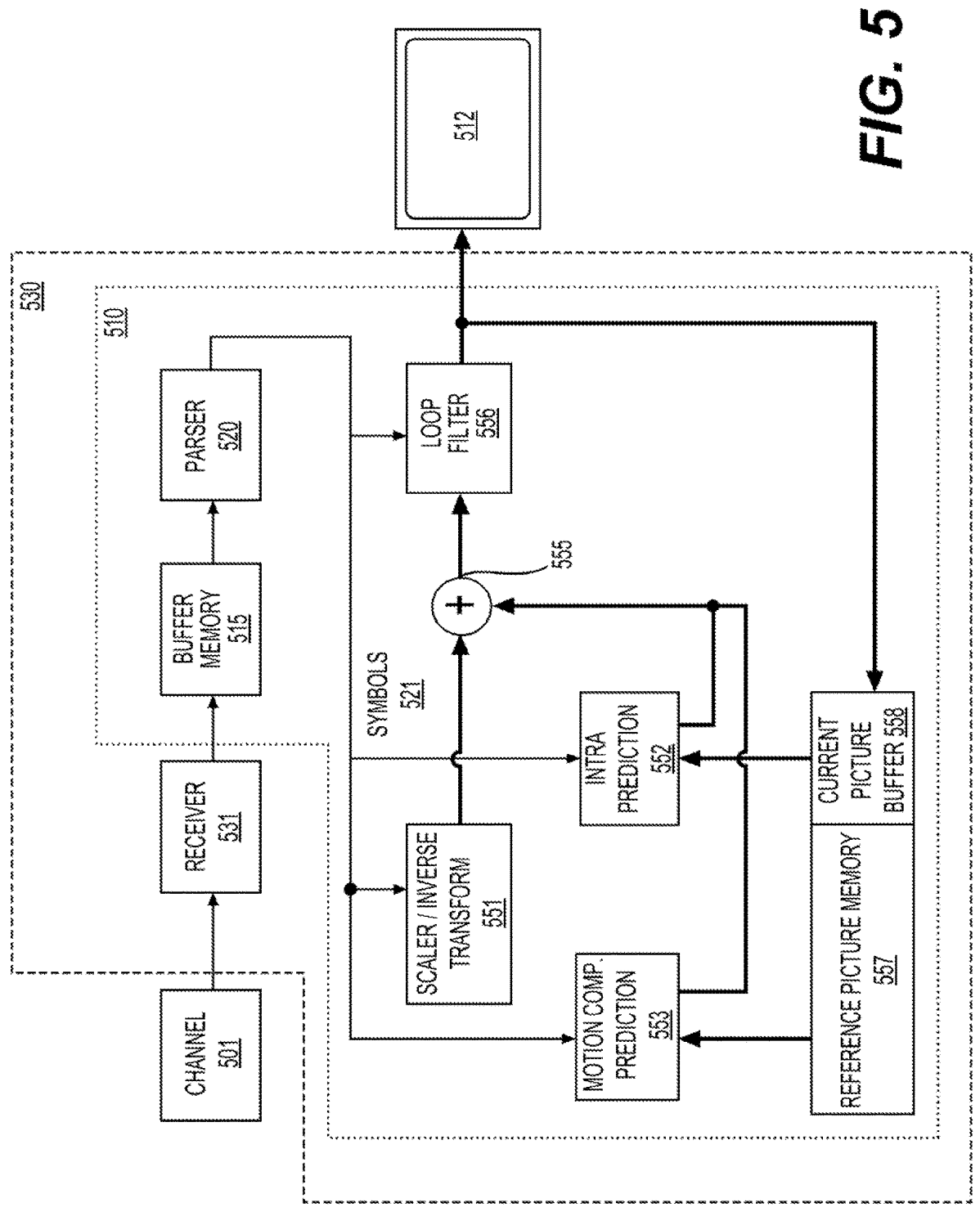
FIG. 5 is a schematic illustration of an exemplary block diagram of a decoder.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega-samples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
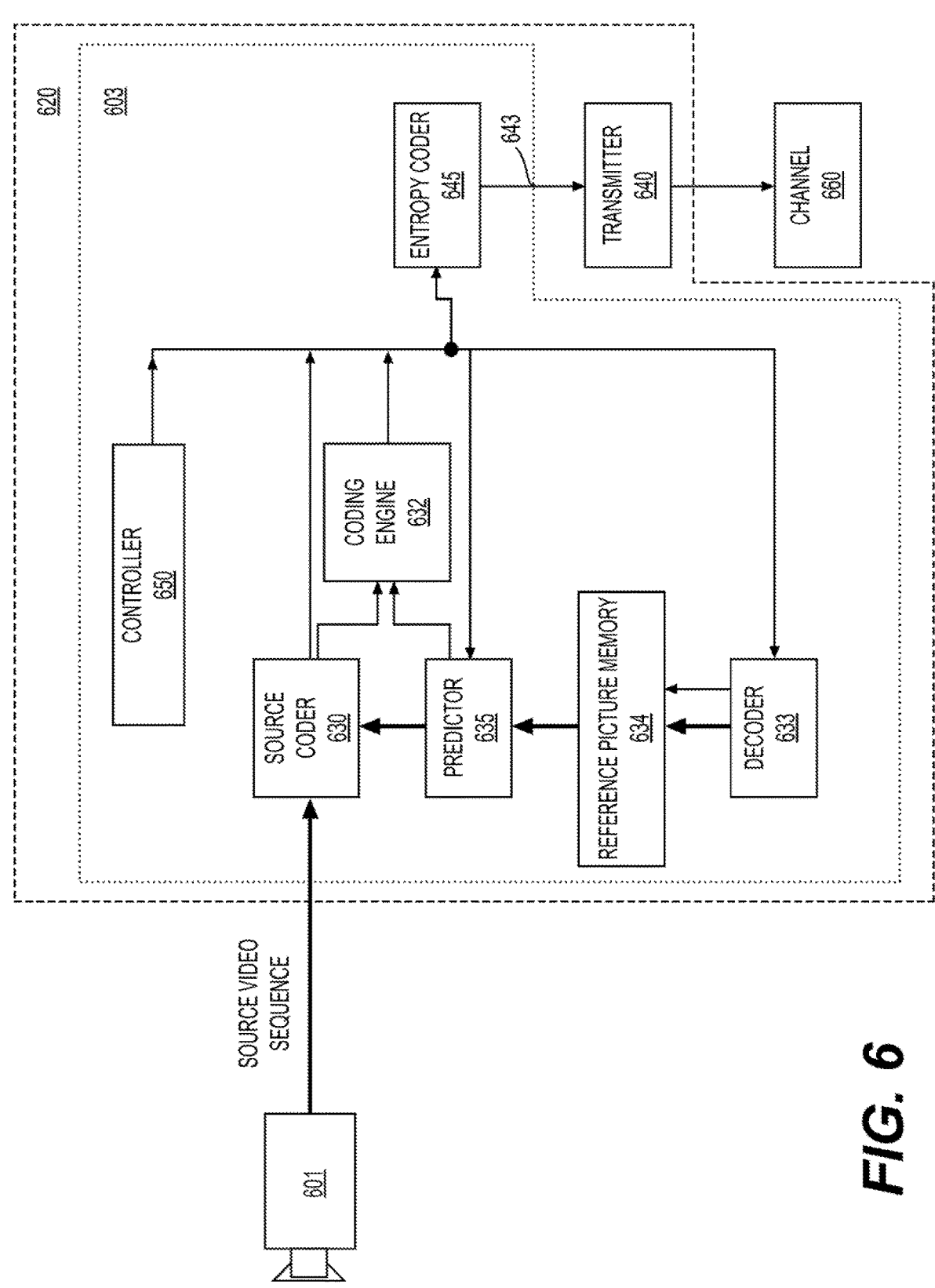
FIG. 6 is a schematic illustration of an exemplary block diagram of an encoder.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
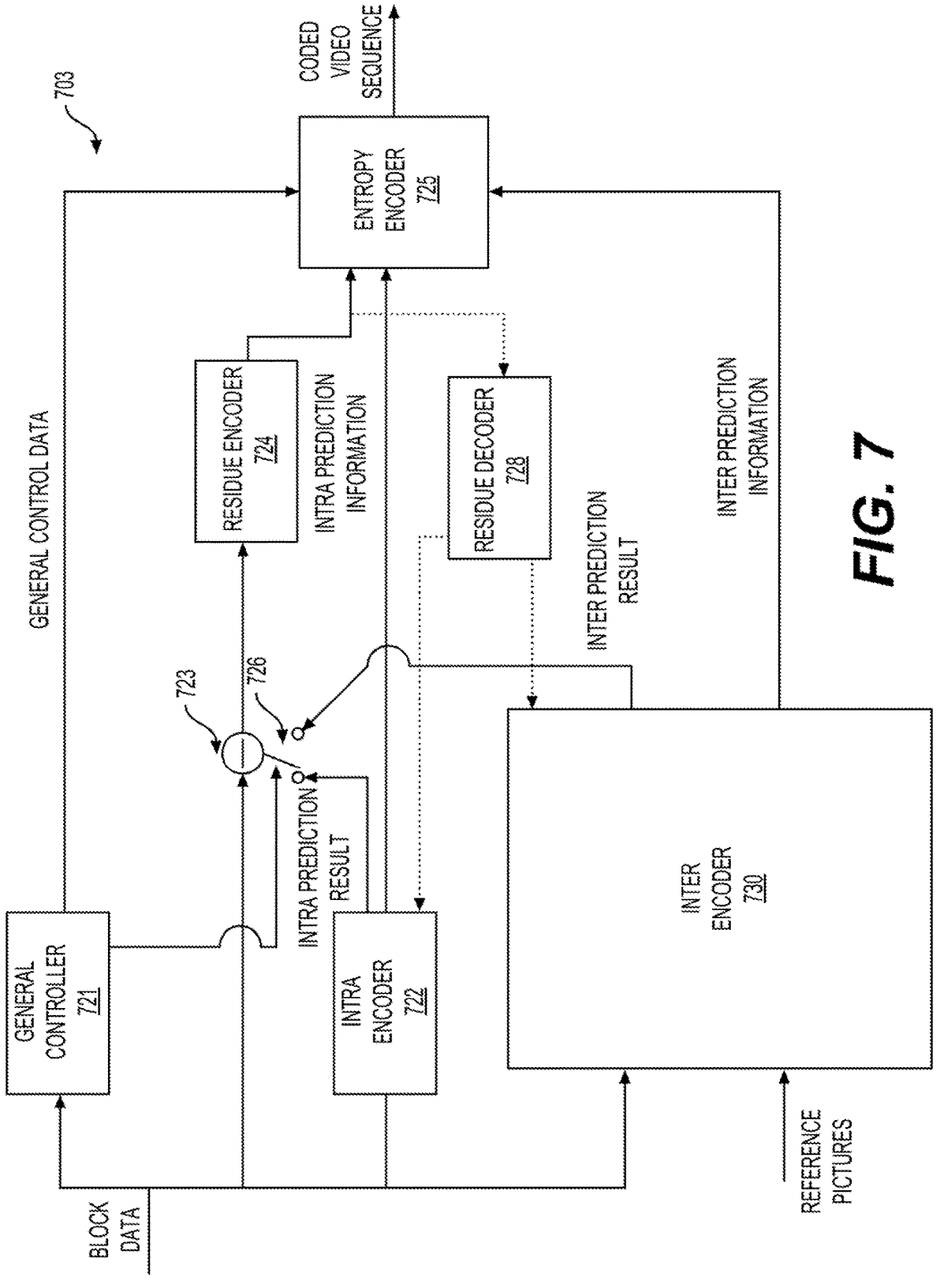
FIG. 7 shows a block diagram of an exemplary encoder.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
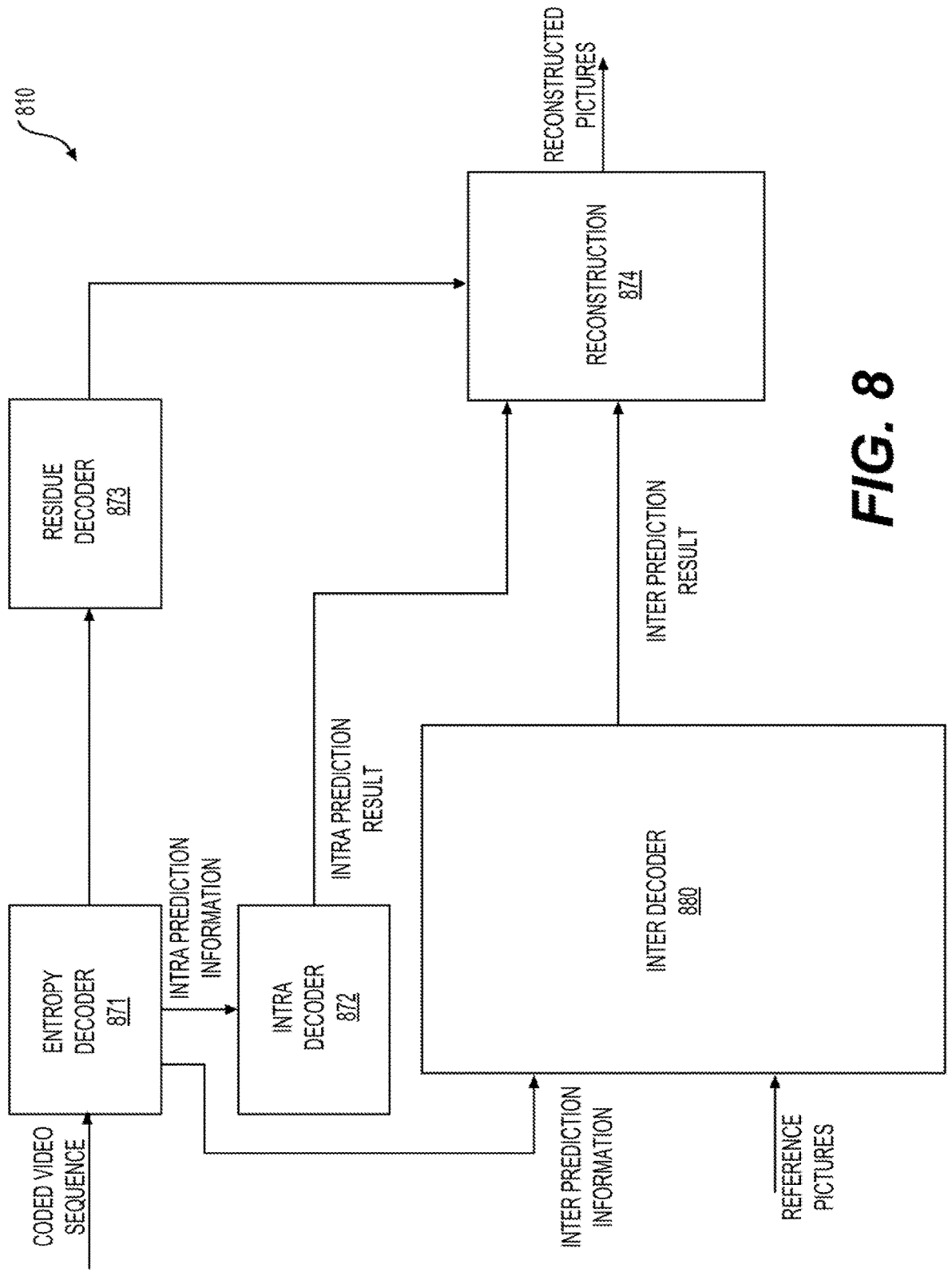
FIG. 8 shows a block diagram of an exemplary decoder.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to recon-struct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coef-ficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to com-bine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodi-ment, the video encoders (403), (603), and (703), and the video decoders (410), (510), and (810) can be implemented using one or more integrated circuits. In another embodi-ment, the video encoders (403), (603), and (603), and the video decoders (410), (510), and (810) can be implemented using one or more processors that execute software instruc-tions.

Various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compen-sated prediction, a subblock-based temporal motion vector prediction (SbTMVP), an adaptive motion vector resolution (AMVR), a motion field storage ($1/16$th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a com-bined inter and intra prediction (CIIP), a geometric parti-tioning mode (GPM), and the like. Inter predictions and related methods are described in details below.

Extended merge prediction can be used in some examples. In an example, such as in VTM4, a merge candidate list is constructed by including the following five types of candi-dates in order: spatial motion vector predictor(s) (MVP(s)) from spatial neighboring CU(s), temporal MVP(s) from collocated CU(s), history-based MVP(s) (HMVP(s)) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Figure 9:
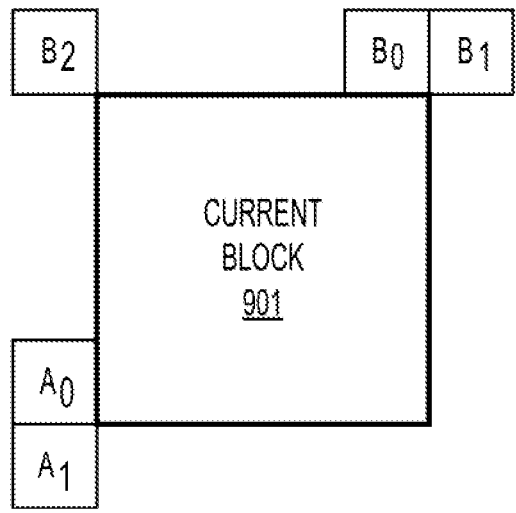
FIG. 9 shows positions of spatial merge candidates according to an embodiment of the disclosure.

Some examples of a generation process of each category of merge candidates are provided below. In an embodiment, spatial candidate(s) are derived as follows. The derivation of spatial merge candidates in VVC can be identical to that in HEVC. In an example, a maximum of four merge candidates are selected among candidates located in positions depicted in FIG. 9. FIG. 9 shows positions of spatial merge candidates according to an embodiment of the disclosure. Referring to FIG. 9, an order of derivation is B1, A1, B0, A0, and B2. The position B2 is considered only when any CU of positions A0, B0, B1, and A1 is not available (e.g., because the CU belongs to another slice or another tile) or is intra coded.

After a candidate at the position A1 is added, the addition of the remaining candidates is subject to a redundancy check which ensures that candidates with same motion information are excluded from the candidate list so that coding efficiency is improved.

Figure 10:
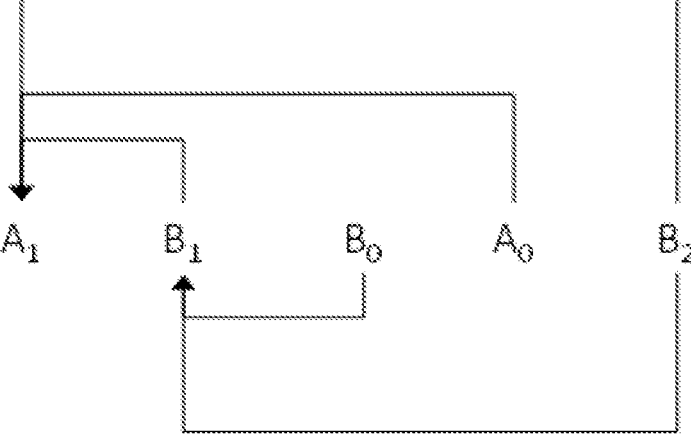
FIG. 10 shows candidate pairs that are considered for a redundancy check of spatial merge candidates according to an embodiment of the disclosure.

To reduce computational complexity, not all possible candidate pairs are considered in the mentioned redundancy check. Instead, only pairs linked with an arrow in FIG. 10 are considered and a candidate is only added to the candidate list if the corresponding candidate used for the redundancy check does not have the same motion information. FIG. 10 shows candidate pairs that are considered for a redundancy check of spatial merge candidates according to an embodiment of the disclosure. Referring to FIG. 10, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

Figure 11:
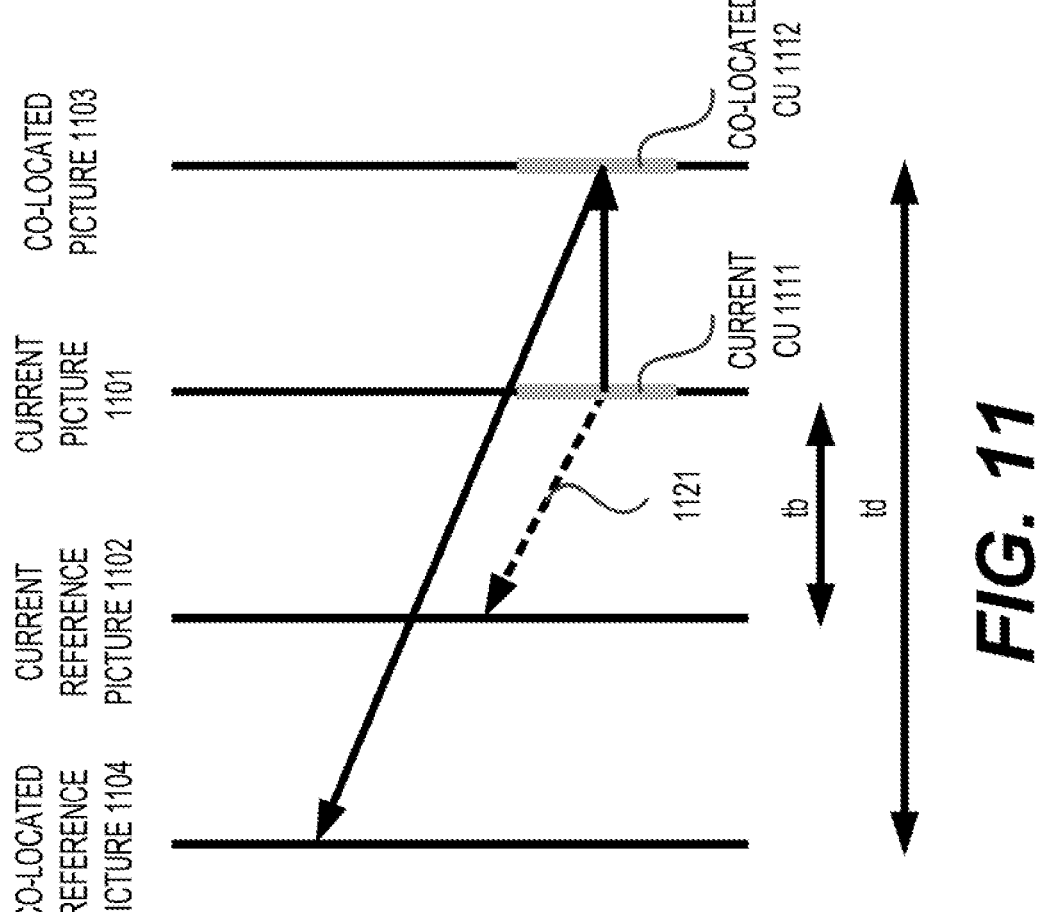
FIG. 11 shows exemplary motion vector scaling for a temporal merge candidate.

In an embodiment, temporal candidate(s) are derived as follows. In an example, only one temporal merge candidate is added to the candidate list. FIG. 11 shows exemplary motion vector scaling for a temporal merge candidate. To derive the temporal merge candidate of a current CU (1111) in a current picture (1101), a scaled MV (1121) (e.g., shown by a dotted line in FIG. 11) can be derived based on a co-located CU (1112) belonging to a collocated reference picture (1104). A reference picture list used to derive the co-located CU (1112) can be explicitly signaled in a slice header. The scaled MV (1121) for the temporal merge candidate can be obtained as shown by the dotted line in FIG. 11. The scaled MV (1121) can be scaled from the MV of the co-located CU (1112) using picture order count (POC) distances tb and td. The POC distance tb can be defined to be the POC difference between a current reference picture (1102) of the current picture (1101) and the current picture (1101). The POC distance td can be defined to be the POC difference between the collocated reference picture (1104) of the co-located picture (1103) and the co-located picture (1103). A reference picture index of the temporal merge candidate can be set to zero.

Figure 12:
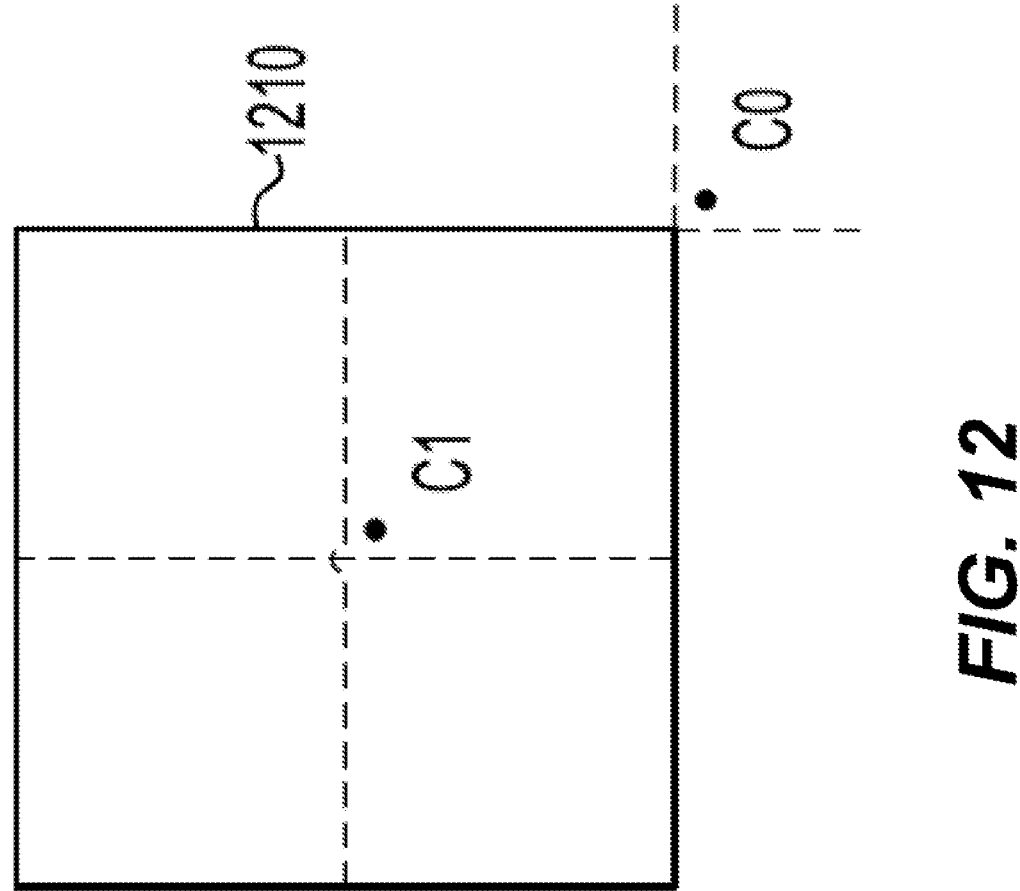
FIG. 12 shows exemplary candidate positions for a temporal merge candidate of a current coding unit.

FIG. 12 shows exemplary candidate positions (e.g., C0 and C1) for a temporal merge candidate of a current CU. A position for the temporal merge candidate can be selected from the candidate positions C0 and C1. The candidate position C0 is located at a bottom-right corner of a co-located CU (1210) of the current CU. The candidate position C1 is located at a center of the co-located CU (1210) of the current CU. If a CU at the candidate position C0 is not available, is intra coded, or is outside of a current row of CTUs, the candidate position C1 is used to derive the temporal merge candidate. Otherwise, for example, the CU at the candidate position C0 is available, intra coded, and in the current row of CTUs, the candidate position C0 is used to derive the temporal merge candidate.

A merge with motion vector difference (MMVD) mode can be used for a skip mode or a merge mode with a motion vector expression method. Merge candidate(s), such as used in VVC, can be reused in the MMVD mode. A candidate can be selected among the merge candidates as a starting point (e.g., an MV predictor (MVP)), and can be further expanded by the MMVD mode. The MMVD mode can provide a new motion vector expression with simplified signaling. The motion vector expression method includes the starting point and an MV difference (MVD). In an example, the MVD is indicated by a magnitude (or a motion magnitude) of the MVD, and a direction (e.g., a motion direction) of the MVD.

The MMVD mode can use a merge candidate list, such as used in VVC. In an embodiment, only candidate(s) which are of a default merge type (e.g., MRG_TYPE_DEFAULT_N) are considered for the MMVD mode. The starting point can be indicated or defined by a base candidate index (IDX). The base candidate index can indicate a candidate (e.g., the best candidate) among the candidates (e.g., the base candidates) in the merge candidate list. Table 1 shows an exemplary relationship between the base candidate index and the corresponding starting point. The base candidate index being 0, 1, 2, or 3 indicates the corresponding starting point being a $1^{st}$ MVP, a $2^{nd}$ MVP, a $3^{rd}$ MVP, or a $4^{th}$ MVP. In an example, if a number of the base candidate(s) is equal to 1, the base candidate IDX is not signaled.

TABLE 1

| Base candidate IDX | | | |
| --- | --- | --- | --- |
| Base candidate IDX | | | |
| 0 | 1 | 2 | 3 |
| $N^{th}$ MVP | $1^{st}$ MVP | $2^{nd}$ MVP | $3^{rd}$ MVP | $4^{th}$ MVP |

A distance index can indicate motion magnitude information of the MVD, such as the magnitude of the MVD. For example, the distance index indicates a distance (e.g., a pre-defined distance) from the starting point (e.g., the MVP indicated by the base candidate index). In an example, the distance is one of a plurality of pre-defined distances, such as shown in Table 2. Table 2 shows an exemplary relationship between the distance index and the corresponding distance (in units of samples or pixels). 1 pel in Table 2 is one sample or one pixel. For example, the distance index being 1 indicates the distance to be ½-pel or ½ samples.

TABLE 2

| Distance IDX | | | | | | | |
| --- | --- | --- | --- | --- | --- | --- | --- |
| Distance IDX | | | | | | | |
| 0 | 1 | 2 | 3 | 4 | 5 | 6 | 7 |
| Pixel distance | 1/4-pel | 1/2-pel | 1-pel | 2-pel | 4-pel | 8-pel | 16-pel | 32-pel |

A direction index can represent the direction of the MVD relative to the starting point. The direction index can represent one of a plurality of directions, such as four directions as shown in Table 3. For example, the direction index being 00 indicates the direction of the MVD being along the positive x-axis.

TABLE 3

| Direction IDX | | | |
| --- | --- | --- | --- |
| Direction IDX | | | |
| | 00 | 01 | 10 | 11 |
| x-axis | + | − | N/A | N/A |
| y-axis | N/A | N/A | + | − |

An MMVD flag can be signaled after sending a skip and merge flag. If the skip and merge flag is true, the MMVD flag can be parsed. In an example, if the MMVD flag is equal to 1, MMVD syntaxes (e.g., including a distance index and/or a direction index) can be parsed. If the MMVD flag is not equal to 1, an AFFINE flag can be parsed. If the AFFINE flag is equal to 1, the AFFINE mode is used to code the current block. If the AFFINE flag is not equal to 1, a skip/merge index can be parsed for a skip/merge mode, such as used in VTM.

Figure 13:
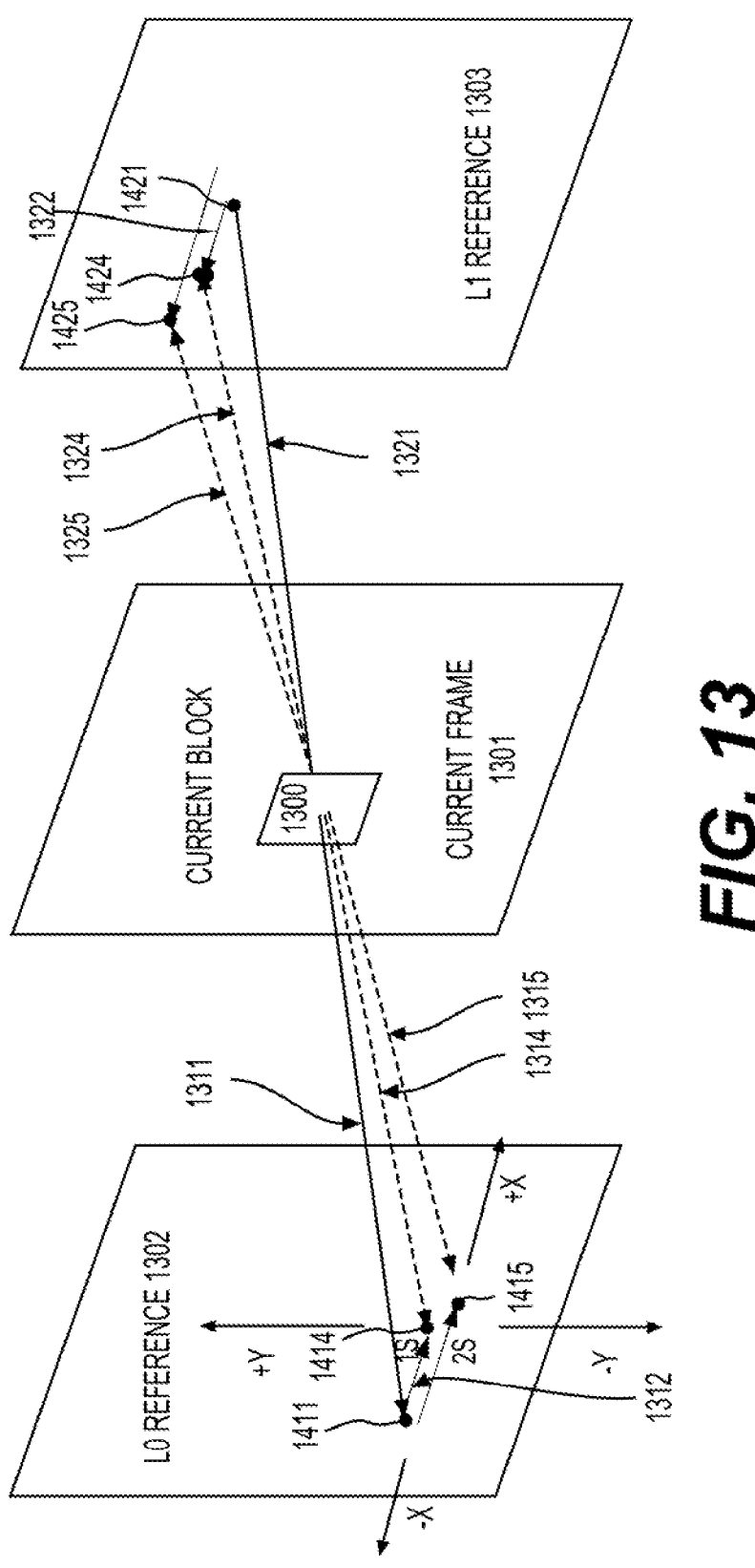

FIGS. 13-14 show an example of a search process in the MMVD mode. By performing the search process, indices including a base candidate index, a direction index, and/or a distance index can be determined for a current block (1300) in a current picture (or referred to as a current frame) (1301).

A first motion vector (MV) (1311) and a second MV (1321) belonging to a first merge candidate are shown. The first merge candidate can be a merge candidate in a merge candidate list constructed for the current block (1300). The first and second MVs (1311) and (1321) can be associated with two reference pictures (1302) and (1303) in reference picture lists L0 and L1, respectively. Accordingly, two starting points (1411) and (1421) in FIGS. 13-14 can be determined at the reference pictures (1302) and (1303), respectively.

In an example, based on the starting points (1411) and (1421), multiple predefined points (e.g., 1-12 shown in FIG. 14) extending from the starting points (1411) and (1421) in vertical directions (represented by +Y, or −Y) or horizontal directions (represented by +X and −X) in the reference pictures (1302) and (1303) can be evaluated. In one example, a pair of points mirroring each other with respect to the respective starting point (1411) or (1421), such as the pair of points (1414) and (1424), or the pair of points (1415) and (1425), can be used to determine a pair of MVs (1314) and (1324) or a pair of MVs (1315) and (1325) which may form MV predictor (MVP) candidates for the current block (1300). The MVP candidates determined based on the predefined points surrounding the starting points (1411) and/or (1421) can be evaluated. Referring to FIG. 13, an MVD (1312) between the first MV (1311) and the MV (1314) has a magnitude of 1S. An MVD (1322) between the second MV (1321) and the MV (1324) has a magnitude of 1S. Similarly, an MVD between the first MV (1311) and the MV (1315) has a magnitude of 2S. An MVD between the second MV (1321) and the MV (1325) has a magnitude of 2S.

In addition to the first merge candidate, other available or valid merge candidates in the merge candidate list of the current block (1300) can also be evaluated similarly. In one example, for a uni-predicted merge candidate, only one prediction direction associated with one of the two reference picture lists is evaluated.

In an example, based on the evaluations, a best MVP candidate can be determined. Accordingly, a best merge candidate corresponding to the best MVP candidate can be selected from the merge list, and a motion direction and a motion distance can also be determined. For example, based on the selected merge candidate and the Table 1, a base candidate index can be determined. Based on the selected MVP, such as that corresponding to the predefined point (1415) (or (1425)), a direction and a distance (e.g., 2S) of the point (1415) with respect to the starting point (1411) can be determined. According to Table 2 and Table 3, a direction index and a distance index can accordingly be determined.

As described above, two indices, such as a distance index and a direction index can be used to indicate an MVD in the MMVD mode. Alternatively, a single index can be used to indicate an MVD in the MMVD mode, for example, with a table that pairs the single index with the MVD.

Figure 15:
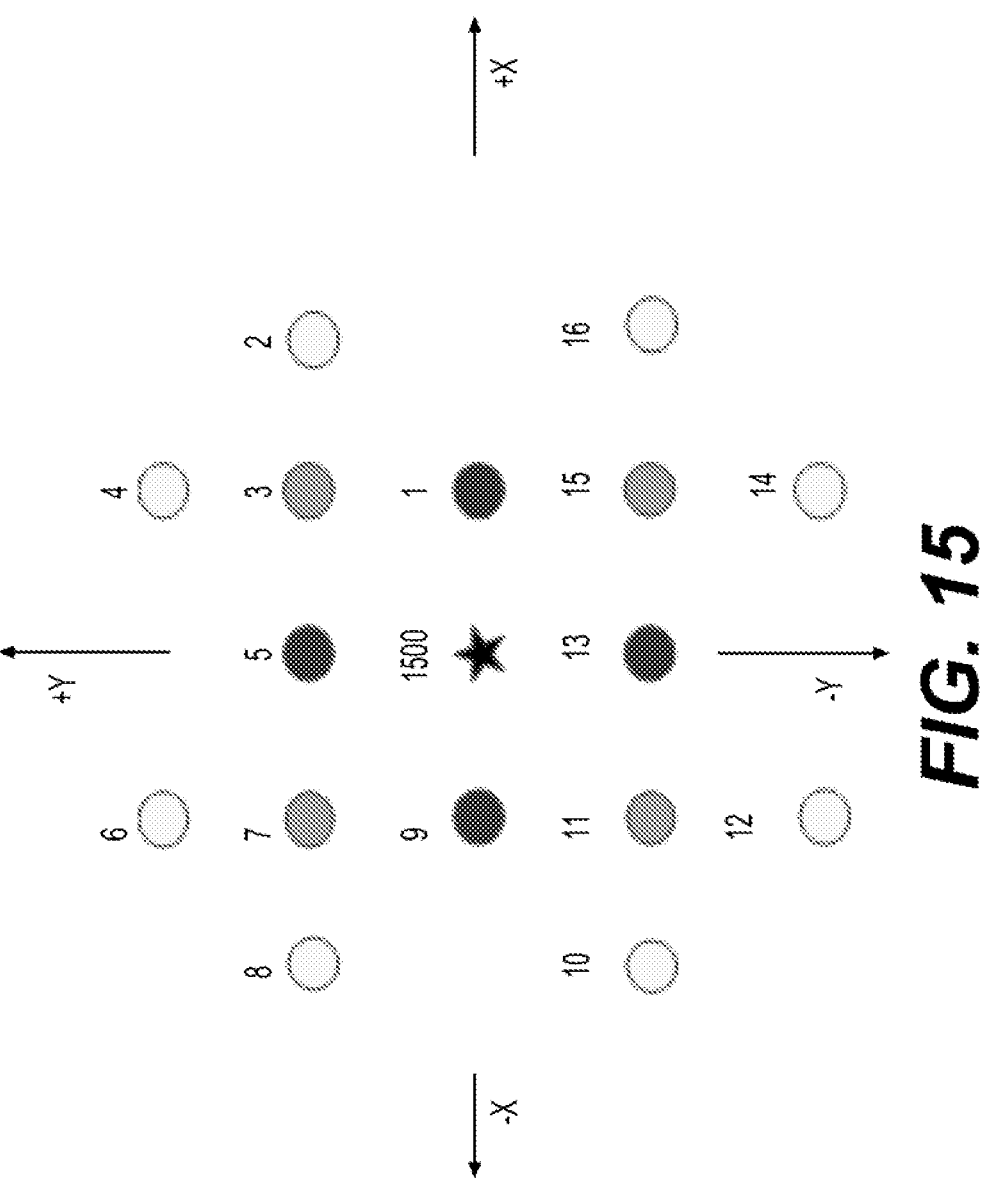
FIG. 15 shows additional refinement positions along multiple diagonal angles in the MMVD mode.

Template matching (TM) based candidate reordering can be used in some prediction modes, such as the MMVD mode and an affine MMVD mode. In an embodiment, MMVD offsets are extended for the MMVD mode and the affine MMVD mode. FIG. 15 shows additional refinement positions along multiple diagonal angles, such as $k \times \pi/8$ diagonal angles where k is an integer from 0 to 15. The additional refinement positions along the multiple diagonal angles can increase a number of directions, for example, from 4 directions (e.g., +X, −X, +Y, and −Y) to 16 directions (e.g., k=0, 1, 2, . . . , 15). In an example, each of the 16 directions is represented by an angle between the +X direction and a direction indicated by a center point (1500) and one of points 1-16. For example, the point 1 indicates +X direction with an angle of 0 (i.e., k=0), the point 2 indicates a direction along an angle of $1 \times \pi/8$ (i.e., k=1), and the like.

The TM can be performed in the MMVD mode. In an example, for each MMVD refinement position, a TM cost can be determined based on a current template of a current block and one or more reference templates. The TM cost can be determined using any method, such as a sum of absolute difference (SAD) (e.g., an SAD cost), a sum of absolute transformed differences (SATD), sum of squared errors (SSE), a mean removed SAD/SATD/SSE, a variance, a partial SAD, a partial SSE, a partial SATD, or the like.

The current template of the current block can include any suitable samples, such as one row of samples above the current block and/or one column of samples to the left of the current block. Based on the TM costs (e.g., SAD costs) between the current template and corresponding reference templates for the refinement positions, MMVD refinement positions, for example, all possible MMVD refinement positions (e.g., 16×6 representing 16 directions and 6 magnitudes) for each base candidate (e.g., an MVP) can be reordered. In an example, top MMVD refinement positions with the smallest TM costs (e.g., the smallest SAD costs) are kept as available MMVD refinement positions for MMVD index coding. For example, a subset (e.g., 8) of the MMVD refinement positions with the smallest TM costs is used for the MMVD index coding. For example, an MMVD index indicates which one of the subset of the MMVD refinement positions with the smallest TM costs is selected to code the current block. In an example, an MMVD index of 0 indicates that an MVD (e.g., an MMVD refinement position) that corresponds to the smallest TM cost is used to code the current block. The MMVD index can be binarized, for example, by the Rice code with a parameter equal to 2.

In an embodiment, in addition to the MMVD offset extension described above, such as in FIG. 15, an affine MMVD reordering is extended where additional refinement positions along $k \times \pi/4$ diagonal angles are added. After reordering, top ½ refinement positions with the smallest TM costs (e.g., SAD costs) are kept to code the current block To improve the coding efficiency and reduce the transmission overhead of MV(s), a subblock level MV refinement can be applied to extend a CU level temporal motion vector prediction (TMVP). In an example, a subblock-based TMVP (SbTMVP) mode allows inheriting motion information at a subblock-level from a collocated reference picture. Each subblock of a current CU (e.g., a current CU with a large size) in a current picture can have respective motion information without explicitly transmitting a block partition structure or the respective motion information. In the SbTMVP mode, motion information for each subblock can be obtained as follows, for example, in three steps. In the first step, a displacement vector (DV) of the current CU can be derived. In the second step, availability of an SbTMVP candidate can be checked and a central motion (e.g., a central motion of the current CU) can be derived. In the third step, subblock motion information can be derived from a corresponding subblock in the collocated block using the DV. The three steps can be combined into one or two steps, and/or an order of the three steps may be adjusted.

Unlike TMVP candidate derivation which derives temporal MVs from a collocated block in a reference frame or a reference picture, in the SbTMVP mode, a DV (e.g., a DV derived from an MV of a left neighboring CU of the current CU) can be applied to locate a corresponding subblock in the collocated picture for each subblock in the current CU that is in the current picture. If the corresponding subblock is not inter-coded, motion information of the current subblock can be set to be the central motion of the collocated block.

The SbTMVP mode can be supported by various video coding standards including for example VVC. Similar to the TMVP mode, for example, in HEVC, in the SbTMVP mode, a motion field (also referred to as a motion information field or an MV field) in the collocated picture can be used to improve MV prediction and a merge mode for CUs in the current picture. In an example, the same collocated picture used by the TMVP mode is used in the SbTVMP mode. In an example, the SbTMVP mode differs from the TMVP mode in the following aspects: (i) the TMVP mode predicts motion information at the CU level while the SbTMVP mode predicts motion information at a sub-CU level; (ii) the TMVP mode fetches the temporal MVs from the collocated block in the collocated picture (e.g., the collocated block is the bottom-right or a center block relative to the current CU) while the SbTMVP mode can apply a motion shift before fetching the temporal motion information from the collocated picture. In an example, the motion shift used in the SbTMVP mode is obtained from an MV of one of spatial neighboring blocks of the current CU.

Figure 16:
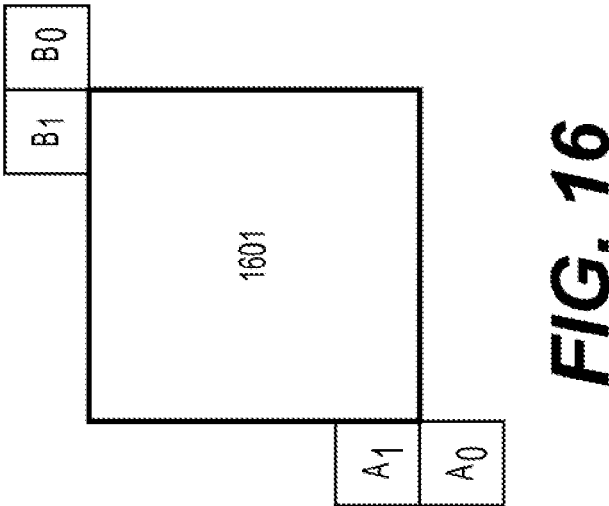
FIGS. 16-17 show an exemplary subblock-based temporal motion vector prediction (SbTMVP) process used in an SbTMVP mode.
Figure 17:
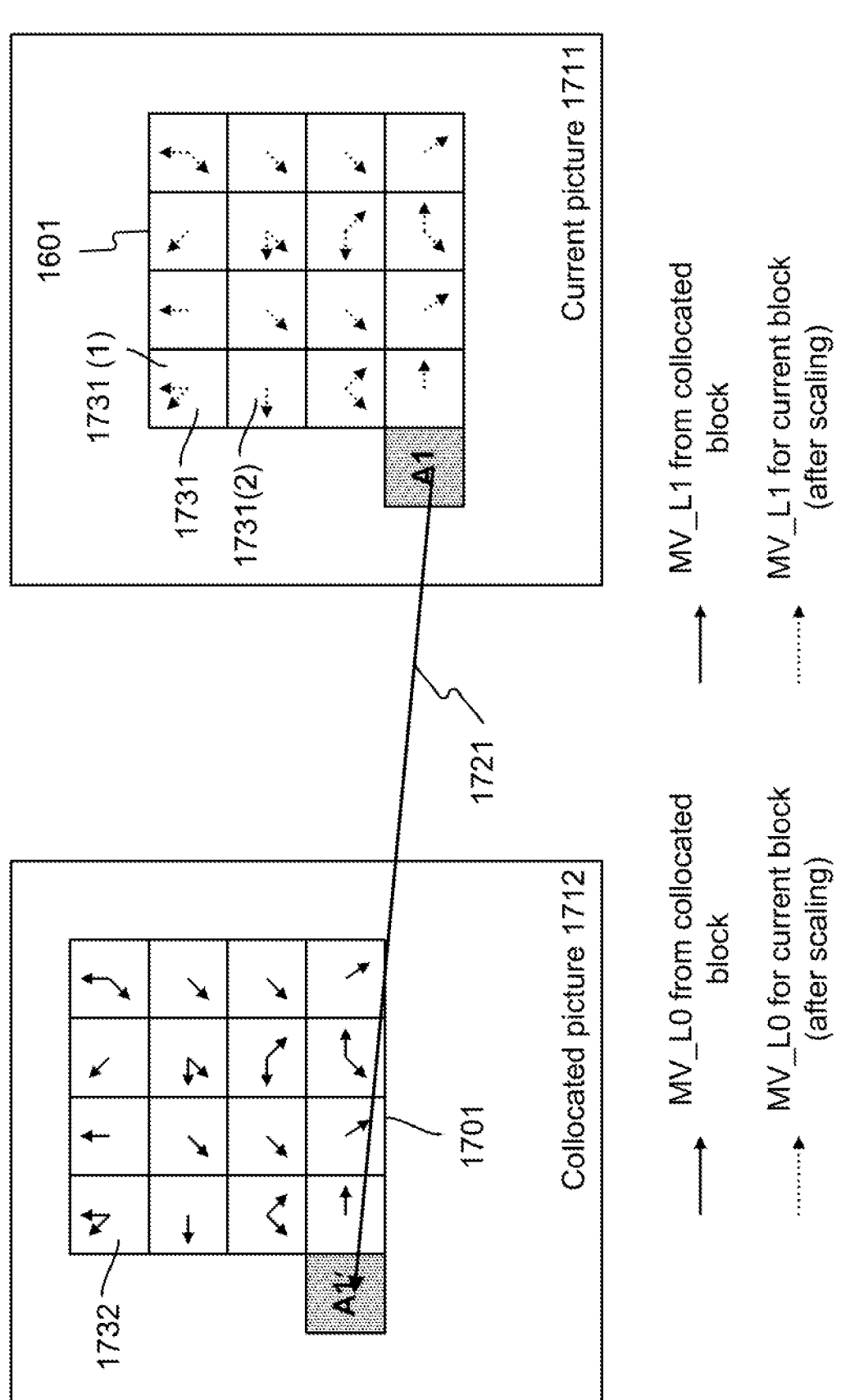

FIGS. 16-17 show an exemplary SbTMVP process used in the SbTMVP mode. The SbTMVP process can predict MVs of sub-CUs (e.g., subblocks) within a current CU (e.g., a current block) (1601) in a current picture (1711), for example, in two steps. In the first step, a spatial neighbor (e.g., A1) of the current block (1601) in FIGS. 16-17 is examined. If the spatial neighbor (e.g., A1) has an MV (1721) that uses a collocated picture (1712) as a reference picture of the spatial neighbor (e.g., A1), the MV (1721) can be selected to be a motion shift (or a DV) to be applied to the current block (1601). If no such MV (e.g., an MV that uses the collocated picture (1712) as a reference picture) is identified, the motion shift or the DV can be set to a zero MV (e.g., (0, 0)). In some examples, MV(s) of additional spatial neighbors, such as A0, B0, B1, and the like are checked if no such MV is identified for the spatial neighbor A1.

In the second step, the motion shift or the DV (1721) identified in the first step can be applied to the current block (1601) (e.g., the DV (1721) is added to coordinates of the current block) to obtain sub-CU level motion information (e.g., including MVs and reference indices) from the collocated picture (1712). In the example shown in FIG. 17, the motion shift or the DV (1721) is set to be the MV of the spatial neighbor A1 (e.g., a block A1) of the current block (1601). For each sub-CU or subblock (1731) in the current block (1601), motion information of a corresponding collocated block (1701) (e.g., motion information of the smallest motion grid that covers a center sample of the collocated block (1701)) in the collocated picture (1712) can be used to derive the motion information for the sub-CU or subblock (1731). After the motion information of the collocated sub-CU (1732) in the collocated block (1701) is identified, the motion information of the collocated sub-CU (1732) can be converted to the motion information (e.g., MV(s) and one or more reference indices) of the current sub-CU (1731), for example, using a scaling method, such as in a similar way as the TMVP process used in HEVC, where temporal motion scaling is applied to align reference pictures of temporal MVs to reference pictures of a current CU.

The motion field of the current block (1601) derived based on the DV (1721) can include motion information of each subblock (1731) in the current block (1601), such as MV(s) and one or more associated reference indices. The motion field of the current block (1601) can also be referred to as an SbTMVP candidate and corresponds to the DV (1721).

FIG. 17 shows an example of the motion field or the SbTMVP candidate of the current block (1601). The motion information of the subblock (1731(1)) that is bi-predicted includes a first MV, a first index indicating a first reference picture in a reference picture list 0 (L0), a second MV and a second index indicating a second reference picture in a reference picture list 1 (L1). In an example, the motion information of the subblock (1731(2)) that is uni-predicted includes an MV and an index indicating a reference picture in L0 or L1.

In an example, the DV (1721) is applied to a central position of the current block (1601) to locate a displaced central position in the collocated picture (1712). If a block including the displaced central position is not inter-coded, the SbTMVP candidate is considered not available. Otherwise, if a block (e.g., the collocated block (1701)) including the displaced central position is inter-coded, the motion information of the central position of the current block (1601), referred to as central motion of the current block (1601), can be derived from motion information of the block including the displaced central position in the collocated picture (1712). In an example, a scaling process can be used to derive the central motion of the current block (1601) from the motion information of the block including the displaced central position in the collocated picture (1712). When the SbTMVP candidate is available, the DV (1721) can be applied to find the corresponding subblock (1732) in the collocated picture (1712) for each subblock (1731) of the current block (1601). The motion information of the corresponding subblock (1732) can be used to derive the motion information of the subblock (1731) in the current block (1601), such as in the same way used to derive the central motion of the current block (1601). In an example, if the corresponding subblock (1732) is not inter-coded, the motion information of the current subblock (1731) is set to be the central motion of the current block (1601).

In some examples, such as in VVC, a combined subblock based merge list which includes an SbTMVP candidate and affine merge candidate(s) is used in the signaling of a subblock based merge mode. The SbTMVP mode can be enabled or disabled by a sequence parameter set (SPS) flag. If the SbTMVP mode is enabled, the SbTMVP candidate (or the SbTMVP predictor) can be added as the first entry of the subblock based merge list including subblock based merge candidates, and followed by the affine merge candidate(s). The size of the subblock based merge list can be signaled in the SPS. In an example, the maximum allowed size of the subblock based merge list is 5 in VVC. In an example, multiple SbTMVP candidates are included in the subblock based merge list.

In some examples, such as in VVC, the sub-CU size used in the SbTMVP mode is fixed to be 8×8, such as used for the affine merge mode. In an example, the SbTMVP mode is only applicable to a CU with both a width and a height being larger than or equal to 8. The subblock size (e.g., 8×8) may be configurable to other sizes, such as 4×4 in an ECM software model use for exploration beyond VVC. In an example, multiple collocated pictures, such as two collocated frames, are utilized to provide temporal motion information for the SbTMVP and/or the TMVP in the AMVP mode.

Motion vector offsets (MVOs) (also referred to as DV offsets) can be used in the SbTMVP mode. In an example, to get a more accurate matching, an MV offset (MVO) (or a DV offset) is added to a DV to determine an updated DV (referred to as DV'), for example, the updated DV' is a vector sum of the DV and the MVO. The MVO can be indicated, for example, by signaling an index indicating the MVO from MVO candidates. In an example, the MVO is signaled. In an example, the MMVD mode is used to indicate the MVO, for example, the MVO is an MVD indicated by a direction index and/or a distance index. By using the MVO, a location of an MV field within a collocated CU (or a collocated block) can be adjusted. When the MVO is not zero, the updated DV' can be used as the displacement vector to indicate the location of the collocated CU (or a collocated block) to perform the SbTMVP process.

A TM method can be applied with the SbTMVP process, for example, with or without MVOs. In an example, the DV used in the SbTMVP mode is used as an MV for the TM process. In the SbTMVP mode, a DV predictor can be derived from motion information of neighboring blocks of the current block. Updated DVs can be determined as vector sums of the DV predictor and respective DVO candidates (or MVO candidates). The DVO candidates (or MVO candidates) can be reordered based on associated TM costs determined using the TM method. In the TM method, a current template of the current block can be compared to each of templates of multiple blocks located at different candidate positions that are specified by the updated DVs, and a TM cost is calculated for each of the DVO candidates. Based on the TM costs, the DVO candidates are reordered, for example, based on an ascending or a descending order of the TM costs. Accordingly, DVO indices (e.g., MMVD indices) that are associated with the DVO candidates can be reordered. In an example, an index in the reordered DVO indices (e.g., the reordered MMVD indices) is selected. The index can be signaled to indicate the selected DVO in the DVO candidates.

In an example, multiple DV predictors (or multiple DVP candidates) are available for the current block. The DV predictors can be reordered based on associated TM costs derived by the TM method as described above. Based on the TM costs, the multiple DV predictors are reordered based on an ascending or a descending order of the TM costs. Accordingly, DVP indices that are associated with the multiple DV predictors can be reordered. In an example, an index in the reordered DVP indices is selected. The index can be signaled to indicate which DV predictor is applied to derive the DV used in the SbTMVP mode.

In an example, candidates in a candidate list include (i) the multiple DVP candidates and (ii) the DV predictor with DVO candidates described above. The candidates can be reordered based on the TM costs, as described above. An index indicating a selected candidate based on the TM costs may be signaled in the bitstream.

As described above, a DV (e.g., a DVP or a DV' based on a DVP and a DVO) is used as an MV used in the TM for the SbTMVP mode. The DV is used to indicate a position of a motion field in a collocated reference picture. Using the DV in the TM may not be reliable because the DV is not used as an MV for the current block in the SbTMVP mode and the SbTMVP mode with the MMVD.

The SbTMVP mode is used to code a current block. When multiple DV candidates of the current block are available, each DV candidate can be used as a DV in the SbTMVP mode to determine a motion field (or MV field) of the current block, such as described in FIGS. 16-17. The motion field of the current block corresponding to the respective DV candidate can include motion information of each subblock in the current block, such as MV(s) and one or more associated reference indices. The motion field of the current block can also be referred to as an SbTMVP candidate. Each of the multiple DV candidates corresponds to an SbTMVP candidate in the SbTMVP candidates.

Template matching can be used to determine a DV candidate from the multiple DV candidates of the current block, for example to determine an SbTMVP candidate from the SbTMVP candidates. A collocated block in a collocated picture can be determined based on a DV candidate in the multiple DV candidates. A reference picture of the DV candidate is the collocated picture. One or more pieces of motion information of (i) the collocated block or (ii) at least one neighboring block of the collocated block in the collocated picture can be used in the TM. Motion information of a current template of the current block can be determined based on the one or more pieces of motion information of (i) the collocated block or (ii) at least one neighboring block of the collocated block. A first reference template in a first reference picture and/or a second reference template in a second reference picture can be determined based on the motion information of the current template of the current block. A TM cost can be determined based on (i) the current template and (ii) the first reference template and/or the second reference template. Similarly, TM costs of other DV candidates in the multiple DV candidates can be determined.

Each TM cost can correspond to a DV candidate and a respective SbTMVP candidate. In an example, the multiple DV candidates include a first DV candidate and a second DV candidate. A first SbTMVP candidate and a first TM can be determined based on the first DV candidate. A second SbTMVP candidate and a second TM can be determined based on the second DV candidate.

An SbTMVP candidate can be determined based on the TM costs associated with the SbTMVP candidates. In an example, the SbTMVP candidates are reordered or ranked based on the TM costs. The SbTMVP candidate can be determined based on the reordered SbTMVP candidates.

Figure 18:
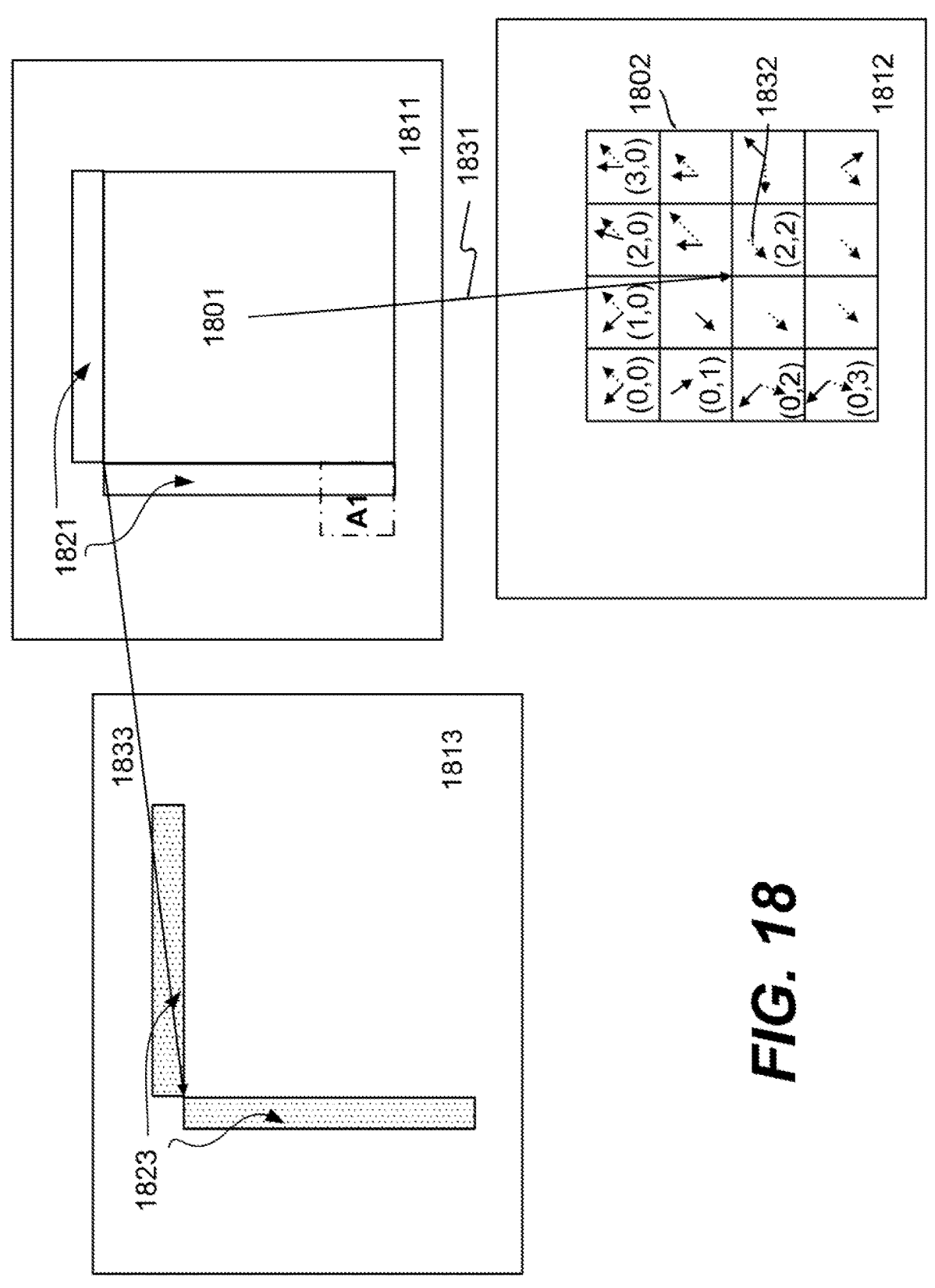
FIG. 18 shows an example of subblock-based template matching (TM) process in the SbTMVP mode.

An MV for the TM in the SbTMVP mode or in the SbTMVP mode with the MMVD can be derived, such as shown in FIG. 18. FIG. 18 shows an example of a subblock-based TM process. A current CU or block (1801) in a current picture (1811) is coded in the SbTMVP mode. A DV (1831) (e.g., an MV of a spatial neighbor A1 of the current block (1801)) can point to a collocated block (1802) in a collocated picture (or a collocated reference picture) (1812). In an example, a reference picture of the DV (1831) is the collocated picture (1812). In an example, the DV (1831) points to a center position in an MV field of the collocated block (1802) in the collocated picture (1812). In the collocated picture (1812), motion information (e.g., MV data) of the center position of the corresponding MV field in the collocated picture (1812) can be determined. For example, the collocated block (1802) includes subblocks located at positions (0,0)-(3,3). The motion information of the center position in the collocated picture (1812) can be referred to as a central motion of the collocated block (1802). The central motion of the collocated block (1802) can be determined based on motion information of subblocks located at the center in the collocated block (1802), such as the subblocks at the positions (1,1), (2,1), (1,2), and (2,2). In an example, the central motion of the collocated block (1802) is the motion information of the subblock at the position (2,2) within the MV field.

MV(s) for the TM in the SbTMVP mode or in the SbTMVP mode with the MMVD can be determined based on the derived central motion. Referring to FIG. 18, the subblock at the position (2, 2) in the collocated block (1802) is uni-predicted, and the central motion includes an MV (1832) that points to a reference picture (1813), for example, in L0. Motion information (e.g., an MV (1833)) of a current template (1821) of the current block (1801) can be determined based on the MV (1832) of the subblock at the position (2, 2) in the collocated block (1802). In an example, a scaling process is performed to determine the MV (1833) based on the MV (1832).

A TM cost can be determined based on the current template (1821) and the reference template (1823), for example, based on an SAD between the current template (1821) and the reference template (1823). Other functions, such as an SSE, an SATD, a variance, a partial SAD, a partial SSE, a partial SATD, a mean removed SAD/SATD/SSE, or the like can also be used to determine the TM cost.

When multiple DVs including the DV (1831) are available for the current block (1801), TM cost(s) of other DV(s) in the multiple DVs can be determined as described above with respect to the DV (1831). As described above, SbTMVP candidates (or MV fields) of the current block (1801) corresponding to the multiple DVs can be reordered or ranked based on the TM costs. An SbTMVP candidate can be determined based on the reordered SbTMVP candidates or the multiple reordered DVs.

Figure 19:
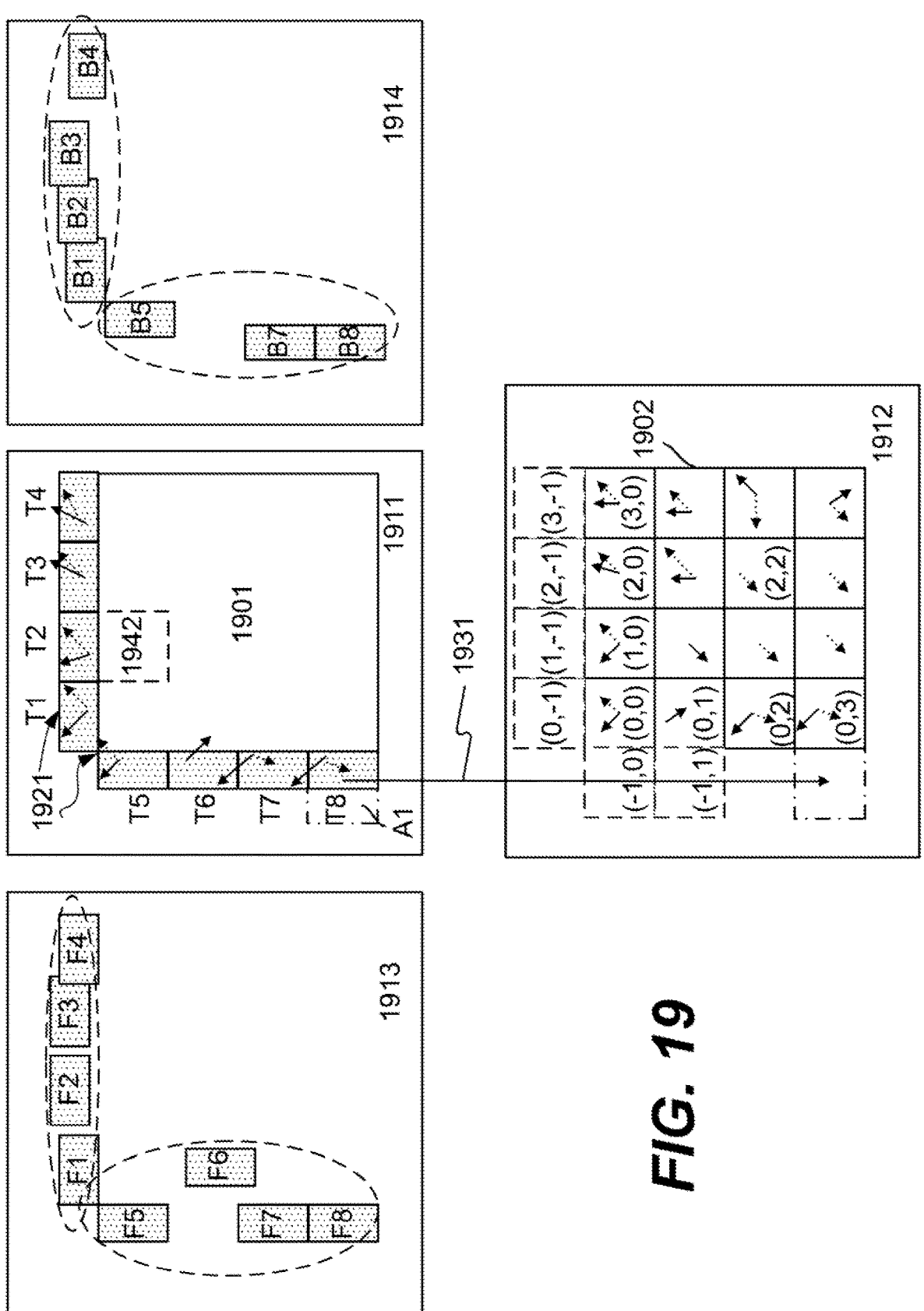
FIG. 19 shows an example of a subblock-based TM process in the SbTMVP mode.

According to an embodiment of the disclosure, a current template of a current CU (or a current block) can include multiple subblock templates, for example, the current template is split into the subblock templates. FIG. 19 shows an example of a subblock-based TM process where a current template (1921) of a current block (1901) in a current picture (1911) includes multiple subblock templates T1-T8. The current template (1921) can include a top template including T1-T4 and a left template including T5-T8. The current block (1901) is coded in the SbTMVP mode. A DV (1931) of the current block (1901) can point to a collocated block (1902) in a collocated picture (1912). In an example, the DV (1931) is an MV of a spatial neighbor A1 of the current block (1901), and a reference picture of the DV (1931) is the collocated picture (1912).

The collocated block (1902) includes subblocks (0,0)-(3, 3) that are located at positions (0,0)-(3,3). For example, the subblock (0,0) at the position (0,0) is a top-left subblock in the collocated block (1902), and the subblock (3,3) at the position (3,3) is a bottom-right subblock in the collocated block (1902). An MV field of the collocated block (1902) can include motion information of each subblock, such as shown in FIG. 19.

In the SbTMVP mode or the SbTMVP mode with DV offsets (e.g., using the MMVD mode), motion information of the multiple subblock templates T1-T8 of the current template (1921) can be derived from motion information of respective subblocks in the collocated picture (1912), such as motion information of respective subblocks in the collocated block (1902) or at least one spatial neighbor of the collocated block (1902).

In an embodiment, motion information of a subblock template (e.g., T2) in the current template (1921) is determined based on motion information of a subblock (e.g., located at (1,0)) in the collocated block (1902). In an example, the subblock (e.g., located at (1,0)) in the collocated block (1902) is collocated with a subblock (e.g., (1942)) in the current block (1901) that is adjacent to the subblock template (e.g., T2).

The motion information (e.g., one or more MVs) of each subblock template in the current template (1921) of the current block (1901) can be derived based on motion information of respective subblock(s) within the collocated block (1902) (e.g., subblock(s) in a top row and/or a left column in the collocated block (1902)). In an example, the motion information of a subblock template in the current template (1921) is derived by copying the motion information of the respective subblock in the top row or the left column in the collocated block (1902). In an example, a scaling process (e.g., a scaling process similar to the MV scaling shown in FIG. 11) is used to derive the motion information of the subblock templates (e.g., T1-T8) in the current template (1921).

In an example, the motion information of the subblock templates T1-T4 of the top template of the current block (1901) are copied from the motion information of the subblocks (0, 0), (1, 0), (2, 0), and (3, 0) within the collocated block (1902), respectively. The motion information of the subblock templates T5-T8 of the left template of the current block (1901) are copied from the motion information of the subblocks (0, 0), (0, 1), (0, 2), and (0, 3) within the collocated block (1902), respectively.

In the collocated picture (1912), subblocks (0, −1), (0, −1), (0, −1), and (0, −1) located at positions (0, −1), (0, −1), (0, −1), and (0, −1) are adjacent to (e.g., above) the collocated block (1902), and are in neighboring block(s) of the collocated block (1902). In an embodiment, motion information of a subblock template (e.g., T2) in the current template (1921) is determined based on motion information of a subblock (e.g., (1, −1)) in one of the neighboring block(s) of the collocated block (1902). The subblock (e.g., (1,−1)) in the one of the neighboring block of the collocated block (1902) can be collocated with the subblock template (e.g., T2).

In an embodiment, the motion information of each subblock template (e.g., T2) in the current template (1921) of the current block (1901) can be derived based on motion information of the corresponding subblock (e.g., (1, −1)) of a neighboring block of the collocated block (1902), for example, by copying the motion information of the corresponding subblock (e.g., (1, −1)). For example, the motion information of T1-T4 is copied from the corresponding motion information of the subblocks (0, −1), (0, −1), (0, −1), and (0, −1) in the top neighboring coding block(s) of the collocated block (1902), respectively. For example, the motion information of T5-T8 is copied from corresponding motion information of subblocks (e.g., left neighboring subblocks of the collocated block (1902)) in left neighboring coding block(s) of the collocated block (1902), respectively.

A subblock template in a current template (e.g., (1921)) of a current block (e.g., (1902)) can be bi-predicted or uni-predicted (e.g., with a reference picture in L0 or L1). The current template can include a first subblock template and a second subblock template. As described above, a first piece of motion information of the first subblock template and a second piece of motion information of the second subblock template can be determined based on different subblocks in a collocated picture (e.g., (1912)). The first piece of motion information of the first subblock template can be different from the second piece of motion information of the second subblock template.

In an example, the first subblock template and the second subblock template are uni-predicted with a reference picture in L0 or in L1. The first piece of motion information includes an MV that is different from an MV in the second piece of motion information.

In an example, the first subblock template and the second subblock template are uni-predicted. The first subblock template and the second subblock template are associated with a first reference picture in L0 and a second reference picture in L1, respectively. The first piece of motion information includes an MV that is different from an MV in the second piece of motion information.

Figure 20:
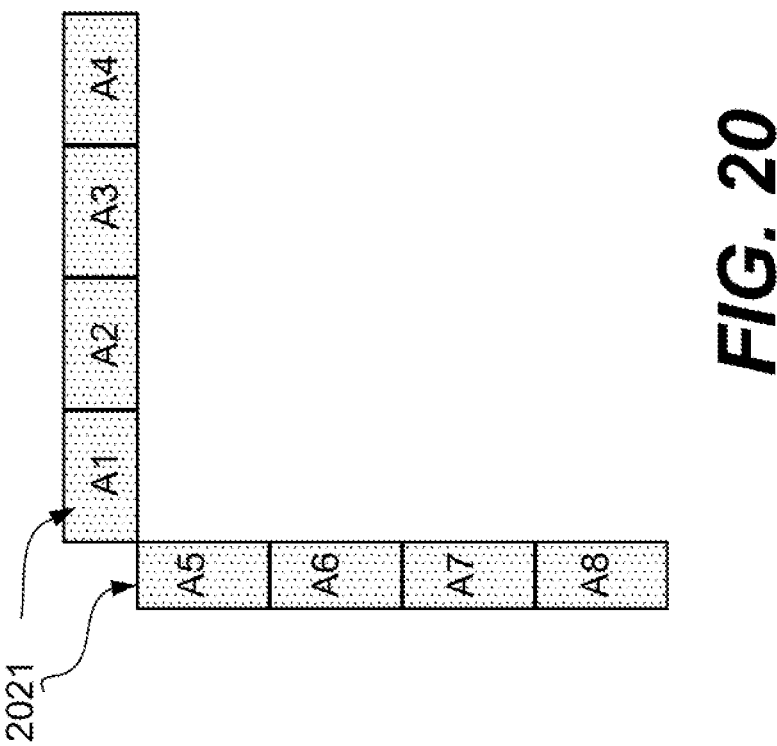
FIG. 20 shows an exemplary predictor template determined based on one or more reference templates in a TM process in the SbTMVP mode.

In an example, referring to FIG. 19, the current template (e.g., (1921)) includes the first subblock template (e.g., T1) and the second subblock template (e.g., T6). The first subblock template (e.g., T1) is bi-predicted and has bi-directional MVs including a first MV and a second MV. For the first subblock template T1, the first MV indicates a subblock reference template F1 in a first reference picture (1913) in L0. The second MV indicates a subblock reference template B1 in a second reference picture (1914) in L1. Accordingly, two uni-directional subblock reference templates F1 and B1 corresponding to T1 are predicted from L0 and L1, respectively. Referring to FIG. 20, a predictor subblock template (e.g., a bi-predictor subblock template) A1 corresponding to T1 can be determined based on F1 and B1, such as a weighted average of F1 and B1.

For other bi-predicted subblock templates in the current template (1921), such as T2-T5, T7, and T8, subblock reference templates (e.g., F2-F5, F7, and F8) in the first reference picture (1913) are determined based on the corresponding motion information (e.g., motion information associated with the first reference picture (1913)) of the other bi-predicted subblock templates in the current template (1921), respectively. Similarly, subblock reference templates (e.g., B2-B5, B7, and B8) in the second reference picture (1914) are determined based on the corresponding motion information (e.g., motion information associated with the second reference picture (1913)) of the other bi-predicted subblock templates in the current template (1921), respectively.

In an example, first reference pictures in L0 associated with the subblocks in the collocated block (1902) are the same first reference picture (1913) in L0, as described above. In an example, the first reference pictures in L0 associated with the subblocks in the collocated block (1902) can include the first reference picture (1913) in L0 and other first reference picture(s) in L0.

In an example, second reference pictures in L1 associated with the subblocks in the collocated block (1902) are the same second reference picture (1914) in L1, as described above. In an example, the second reference pictures in L1 associated with the subblocks in the collocated block (1902) can include the second reference picture (1914) in L1 and other second reference picture(s) in L1.

Referring to FIG. 20, predictor subblock templates (e.g., bi-predictor subblock templates) A2-A5, A7, and A8 corresponding to T2-T5, T7, and T8 can be determined based on F2-F5, F7, and F8 and B2-B5, B7, and B8, respectively, such as weighted averages of F2-F5, F7, and F8 and B2-B5, B7, and B8, respectively.

The second subblock template (e.g., T6) is uni-predicted. T6 only has a single uni-directional MV. In the example shown in FIG. 19, the uni-directional MV of T6 points to a subblock reference template F6 in the first reference picture (1913). Referring to FIG. 20, a predictor subblock template (e.g., a uni-predictor subblock template) A6 corresponding to T6 can be determined based on F6. In an example, A6 is equal to F6.

Referring to FIG. 20, a predictor template (2021) includes A1-A8. A TM cost can be derived based on the current template (1921) and the predictor template (e.g., including all the predictor subblock templates A1-A8) (2021), such as a distortion between the current template (1921) and the predictor template (2021). The distortion can be determined using but is not limited to an SAD, an SATD, an SSE, a variance, a partial SAD/SATD/SSE, a mean removed SAD/SATD/SSE, or the like, as described above. In an example of a partial SAD, a portion of the current template (1921) and a corresponding portion of the predictor template (2021) are used to determine the TM cost. In an example of a partial SAD, (i) a portion of or the current template (1921) and (ii) a portion of or the predictor template (2021) are downsampled before being used to determine the TM cost.

In an example, the TM cost is determined as the SAD between the current template (1921) (denoted as TC) and the predictor template (2021) (denoted as TP) as below.

$$TM \ \text{cost} = SAD(TP - TC) \qquad \text{Eq. 1}$$

In an example, the TM cost can be accumulated based on subblock based TM costs (e.g., $SAD(A_k - T_k)$) of the subblock templates (e.g., $T_k$ and $A_k$), such as shown below.

$$TM \ \text{cost} = \sum_k SAD(A_k - T_k) \qquad \text{Eq. 2}$$

$T_k$ (e.g., $T_1$) and $A_k$ (e.g., $A_1$) are a kth subblock template in the current template (1921) and a kth predictor subblock template in the predictor template (2021), respectively, where k is a positive integer from 1 to 8.

In an embodiment, the distortion value (e.g., $(A_k - T_k)$ or $SAD(A_k - T_k)$) can be modified, for example, by applying a bias factor, depending on whether a subblock template of the current template (1921) of the current block (1901) has bi-directional MVs or only has a uni-directional MV. In an example, when the subblock template of the current template (1921) has bi-directional MVs, a bias factor is less than a bias factor used when the subblock template of the current template (1921) has only a uni-directional MV.

In an example, a first distortion value (e.g., $(SAD(A_1 - T_1))$ is modified differently from a second distortion value (e.g., $(SAD(A_2 - T_2)$ or $(SAD(A_6 - T_6))$.

In the example of FIG. 19, the subblock reference templates in the first reference picture (1913) F1-F8 correspond to T1-T8 in the current template (1921), respectively. The subblock reference templates in the second reference picture (1913) B1-B5, B7, and B8 correspond to T1-T5, T7, and T8 in the current template (1921), respectively. T6 does not have a corresponding subblock reference template in the second reference picture (1914) because T6 is uni-predicted with the uni-directional MV pointing to the first reference picture (1913).

A width (or a subblock template width) W1 and a height (or a subblock template height) H1 of the subblock templates T1-T8 in the current template (1921) can be any suitable positive integers. A width (or a subblock width) W2 and a height (or a subblock height) H2 of the subblocks in the collocated block (1902) can be any suitable positive integers.

The subblock template width W1 of T1-T4 in the top template may be different from or identical to the subblock width W2. The subblock template height H1 of T5-T8 in the left template may be different from or identical to the subblock height H2.

In an example, the subblock template width W1 of T1-T4 in the top template is a multiple of the subblock width W2, such as W1=n×W2, where n is an integer larger than 1. In an example, the subblock template height H1 of T5-T8 in the left template is a multiple of the subblock width H2, such as H1=m×H2, where m is an integer larger than 1. In an example, n and m are 2.

The subblock template width W1 of T1-T4 in the top template or the subblock template height H1 of T5-T8 in the left template may be dependent on a coding block size, such as a width, a height, an area size, an aspect ratio.

When the subblock template width W1 of T1-T4 in the top template is different from the subblock width W2, for example, W1>W2, multiple pieces of motion information from multiple subblocks in the collocated picture (1912) may be fetched for each subblock template in T1-T4. For example, if W1 is 2×W2, two pieces of motion information from the subblocks (0,0) and (1,0) are used to determine the motion information of T1. Alternatively, two pieces of motion information from the subblocks (0,−1) and (1,−1) are used to determine the motion information of T1.

When the subblock template height H1 of T5-T8 in the left template is different from the subblock height H2, for example, H1>H2, multiple pieces of motion information from multiple subblocks in the collocated picture (1912) may be fetched for each subblock template in T5-T8. For example, if H1 is 2×H2, two pieces of motion information from the subblocks (0,0) and (0,1) are used to determine the motion information of T5. Alternatively, two pieces of motion information from the subblocks (−1,0) and (−1,0) are used to determine the motion information of T5.

An average, a weighted average, or a median filter of multiple pieces of motion information from multiple subblocks in the collocated picture (1912) can be used to determine motion information of a subblock template in the current template (1921). Subsequently, the motion information of the subblock template (e.g., T1) can be used to identify the subblock reference template(s) (e.g., F1 and B1) in reference picture(s) to calculating the TM cost.

FIG. 19 shows examples for determining a TM cost that corresponds to an SbTMVP candidate of the current block (1901) which corresponds to a DV candidate (e.g., the DV (1931)) of the current block (1901). For example, multiple pieces of motion information of multiple subblocks (e.g., (i) the top row of subblocks and the left column of subblocks or (ii) the top neighboring subblocks and the left neighboring subblocks) in the collocated picture (1912) are determined based on the DV candidate (e.g., the DV (1931)). The subblock reference templates (e.g., F1-F8, B1-B5, B7, and B8) are determined based on the multiple pieces of motion information of the multiple subblocks in the collocated picture (1912). The predictor template (2021) can be determined based on the subblock reference templates (e.g., F1-F8, B1-B5, B7, and B8). Subsequently, the TM cost can be determined based on the current template (1921) and the predictor template (2021).

A current template (e.g., (1821) or (1921)) can include any suitable samples from neighboring block(s) and/or neighboring subblock(s) of a current block (e.g., (1801) or (1901)). The current template can include (i) only a top template including one or more rows of samples above the current block, (ii) only a left template including one or more columns of samples to the left of the current block, or (iii) the top template and the left template such as used in FIGS. 18-19. In an example, additional sample(s) other than the top template and the left template can be included in the current template. In an example, the top template and/or the left template can be down-sampled to obtain the current template. The top template and/or the left template can have any suitable widths and/or heights.

In an embodiment, the subblock merge index (indicating SbTMVP candidate in the subblock merge list) and/or SbTMVP MMVD index is reordered according to the TM cost in ascending order. SbTMVP candidates are reordered based on TM costs; SbTMVP candidates corresponding to DV (or DVP only or DVP+MMVD); index is signaled to indicate the selected candidate In an embodiment, multiple DV candidates are available for the current block. Each of the multiple DV candidates can correspond to an SbTMVP candidate of the current block. A TM cost corresponding to each SbTMVP candidate can be determined based on the corresponding DV candidate, for example, using embodiments described in FIG. 19. For example, the TM process described in FIG. 19 is used to calculate TM costs between a current template of the current block and predictor templates corresponding to the multiple DV candidates in the SbTMVP mode with or without DVOs (e.g., MVDs used in the MMVD mode).

In an embodiment, the multiple DV candidates include multiple DV predictors. Each of the multiple DV predictors can be derived from a set of predefined candidates including (i) MV(s) of spatial neighboring block(s) of the current block, (ii) MV(s) of spatial neighboring subblock(s) of the current block, (iii) HMVP candidate(s), or (iv) candidate(s) in a merge candidate list. In an example, if an MV of one of the predefined candidates in the merge candidate list points to one of collocated picture(s) for the current block, the MV is one of the multiple DV candidates of the current block.

The HMVP candidate(s) can re-use MVs of previously coded CUs, including non-adjacent CUs that are not adjacent to the current block.

In an example, the merge candidate list is a regular merge candidate list, such as a regular merge/skip candidate list. The regular merge candidate list can be different from a subblock merge candidate list. The candidate(s) in the regular merge candidate list can include any suitable candidate(s) used in a regular merge/skip mode. The candidates can include spatial candidate(s) (e.g., spatial MVP(s) from spatial neighboring CU(s)), temporal candidate(s) (e.g., temporal MVP(s) from collocated CU(s)), HMVP candidate(s), pairwise average candidates (e.g., pairwise average MVP(s)), and/or zero MV(s). A pairwise average MVP can be generated using two existing candidates in the regular merge candidate list. The regular merge/skip mode can be different from additional merge/skip modes, such as the MMVD mode, CIIP mode, and the GPM mode.

As described above, the multiple DV predictors correspond to the SbTMVP candidates. The SbTMVP candidates can be included in a subblock merge candidate list. The TM costs corresponding to each SbTMVP candidate can be determined based on the corresponding DV predictor without DVOs. The SbTMVP candidates can be reordered based on the associated TM costs, such as in an ascending order or a descending order of the TM costs. An SbTMVP candidate can be selected from the reordered SbTMVP candidates to code the current block. In an example, an index, such as a subblock merge index indicating the SbTMVP candidate in the subblock merge candidate list, is signaled to indicate the selected SbTMVP candidate.

In an embodiment, the multiple DV candidates are based on a DV predictor, for example, that is derived from one or more candidates in the set of predefined candidates described above. The multiple DV candidates can be vector sums of the DV predictor and respective DV offsets (or MV offsets). As described above, the DV offsets correspond to the SbTMVP candidates in the subblock merge candidate list. The TM costs corresponding to each SbTMVP candidate can be determined based on the corresponding DV candidate which is a vector sum of the DV predictor and the respective DV offset. The SbTMVP candidates can be reordered based on the associated TM costs, such as in an ascending order or a descending order of the TM costs. An SbTMVP candidate can be selected from the reordered SbTMVP candidates to code the current block. In an example, an index, such as a DV offset index (e.g., an MMVD index if the MMVD mode is used to determine the DV offsets) indicating the SbTMVP candidate in the subblock merge candidate list, is signaled to indicate the selected SbTMVP candidate.

In an embodiment, the multiple DV candidates include DV predictor(s) and vector sums of DV predictor(s) and associated DV offset(s) that correspond to SbTMVP candidates. The TM costs corresponding to each SbTMVP candidate can be determined based on the corresponding DV candidate (e.g., (i) a DV predictor or (ii) a vector sum of a DV predictor and a DV offset). The SbTMVP candidates can be reordered based on the associated TM costs. An SbTMVP candidate can be selected from the reordered SbTMVP candidates to code the current block. In an example, an index indicating the SbTMVP candidate in the subblock merge candidate list, is signaled to indicate the selected SbTMVP candidate.

In an example, after determining the TM costs corresponding to the SbTMVP candidates, the SbTMVP candidate is determined to be the SbTMVP candidate that corresponds to the smallest TM cost in the TM costs. Accordingly, an index is not needed, for example, no index is signaled to indicate which SbTMVP candidate is selected.

Figures 21A, 21B:
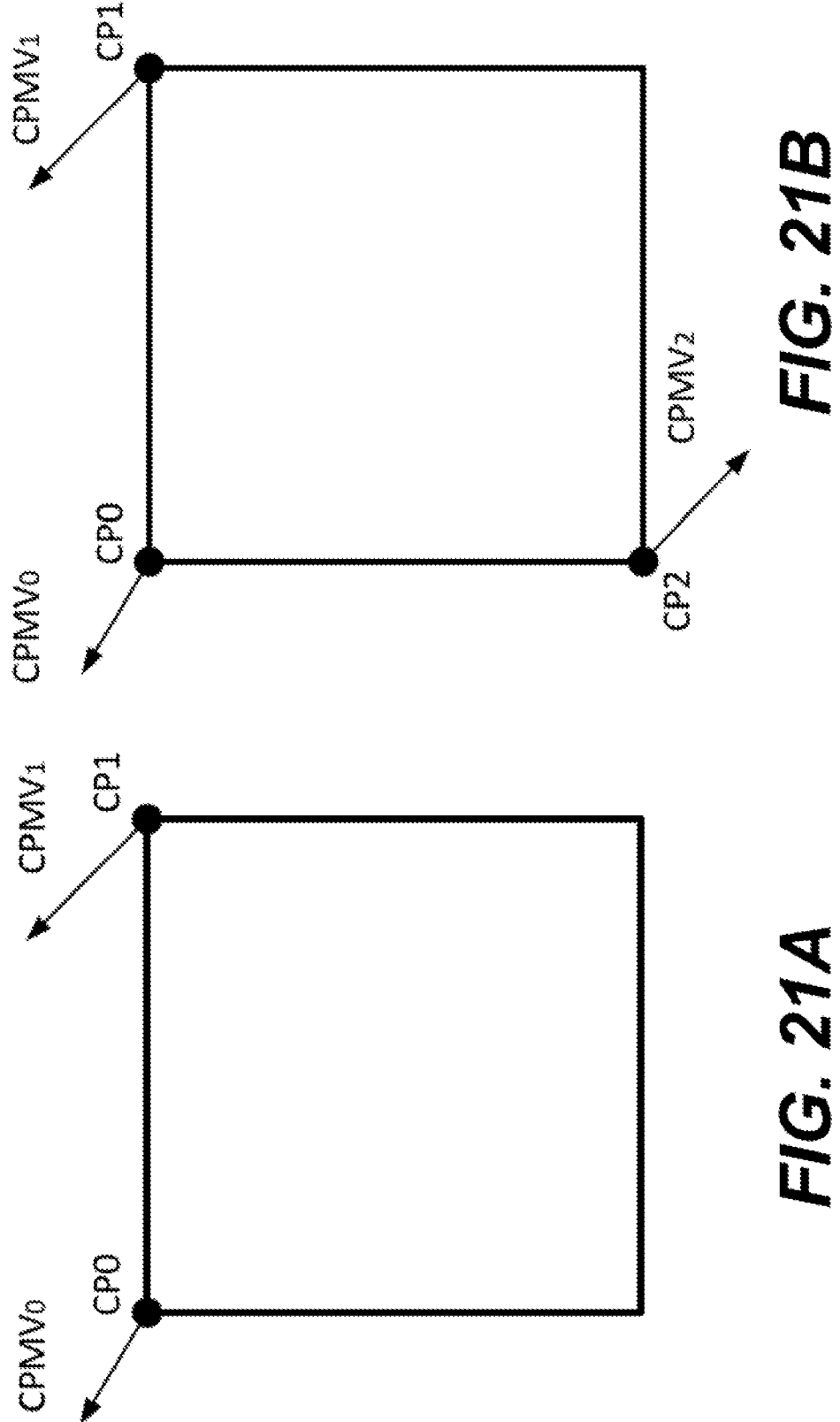
FIG. 21A shows an example of a 4-parameter affine motion model.
FIG. 21B shows an example of a 6-parameter affine motion model.

In some embodiments, a block-based affine transform motion compensation prediction is applied. In FIG. 21A, an affine motion field of a block is described by two control point motion vectors (CPMVs), CPMV0 and CPMV1, of two control points (CPs), CP0 and CP1 when a 4-parameter affine model is used. In FIG. 21B, an affine motion field of a block is described by three CPMVs, CPMV0, CPMV1 and CPMV3, of CPs, CP0, CP1, and CP2 when a 6-parameter affine model is used.

For a 4-parameter affine motion model, a motion vector at a sample location (x, y) in a block is derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \qquad \text{Eq. 3}$$

For a 6-parameter affine motion model, a motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \qquad \text{Eq. 4}$$

In Eqs. 3-4, $(mv_{0x}, mv_{0y})$ is a motion vector of the top-left corner control point, $(mv_{1x}, mv_{1y})$ is motion vector of the top-right corner control point, and $(mv_{2x}, mv_{2y})$ is motion vector of the bottom-left corner control point. In addition, the coordinate (x, y) is with respect to the top-left corner of the respective block, and W and H denotes the width and height of the respective block.

Figure 22:
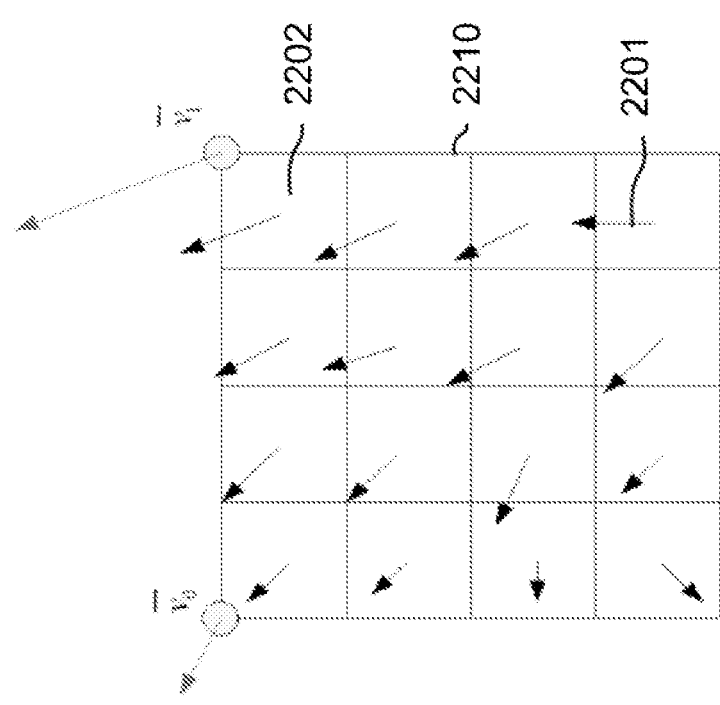
FIG. 22 shows an example of a sub-block based affine transform prediction.

In order to simplify the motion compensation prediction, a sub-block based affine transform prediction is applied in some embodiments. For example, in FIG. 22, the 4-parameter affine motion model is used, and two CPMVs, $\overrightarrow{v_0}$ and $\overrightarrow{v_1}$, are determined. To derive a motion vector of each 4×4 (samples) luma sub-block (2202) partitioned from the current block (2210), a motion vector (2201) of the center sample of each sub-block (2202) is calculated according to Eq. 3, and rounded to a $\frac{1}{16}$ fraction accuracy. Then, motion compensation interpolation filters are applied to generate a prediction of each sub-block (2202) with the derived motion vector (2201). The sub-block size of chroma-components is set to be 4×4. A MV of a 4×4 chroma sub-block is calculated as the average of the MVs of the four corresponding 4×4 luma sub-blocks.

Similar to translational motion inter prediction, two affine motion inter prediction modes, affine merge mode and affine AMVP mode, are employed in some embodiments.

In some embodiments, an affine merge mode can be applied for CUs with both width and height larger than or equal to 8. Affine merge candidates of a current CU can be generated based on motion information of spatial neighboring CUs. There can be up to five affine merge candidates and an index is signaled to indicate the one to be used for the current CU. For example, the following three types of affine merge candidates are used to form an affine merge candidate list:

Inherited affine merge candidates that are extrapolated from CPMVs of the neighbor CUs;

Constructed affine merge candidates that are derived using the translational MVs of the neighbor CUs; and Zero MVs.

In some embodiments, there can be at most two inherited affine candidates which are derived from affine motion models of the neighboring blocks, one from left neighboring CUs and one from above neighboring CUs. The candidate blocks, for example, can be located at positions shown in FIG. 9. For the left predictor, the scan order is A0>A1, and for the above predictor, the scan order is B0>B1>B2. Only the first inherited candidate from each side is selected. No pruning check is performed between two inherited candidates.

Figure 23:
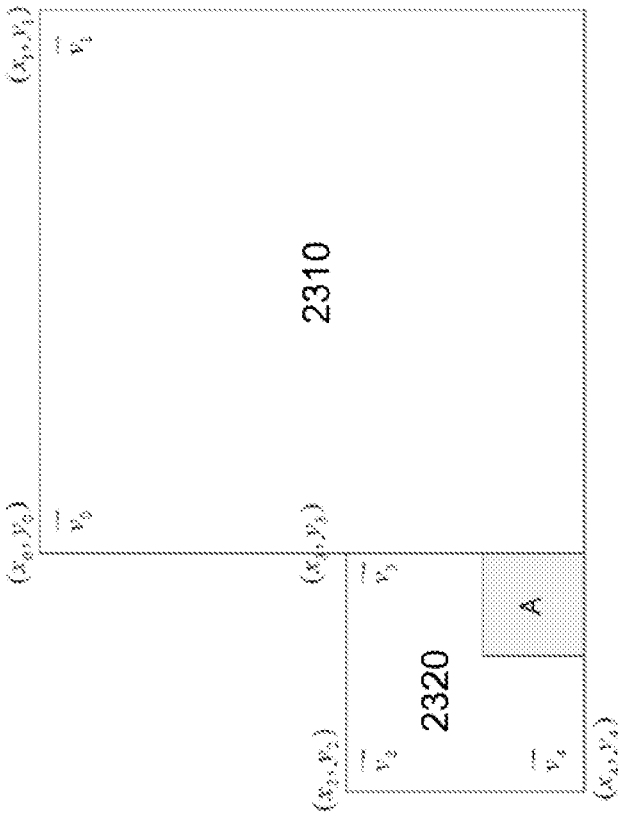
FIG. 23 shows an example of determining a control point motion vector (CPMV) candidate in an affine merge list of a current CU.

When a neighboring affine CU is identified, CPMVs of the identified neighboring affine CU are used to derive a CPMV candidate in the affine merge list of the current CU. As shown in FIG. 23, a neighbor left bottom block A of a current CU (2310) is coded in an affine mode. Motion vectors, $\overrightarrow{v_2}, \overrightarrow{v_3}$ and $\overrightarrow{v_4}$ of the top left corner, above right corner and left bottom corner of a CU (2320) which contains the block A are attained. When block A is coded with a 4-parameter affine model, two CPMVs $\overrightarrow{v_0}$ and $\overrightarrow{v_1}$ of the current CU (2310) are calculated according to $\overrightarrow{v_2}$, and $\overrightarrow{v_3}$. In case that block A is coded with 6-parameter affine model, three CPMVs (not shown) of the current CU are calculated according to $\overrightarrow{v_2}, \overrightarrow{v_3}$ and $\overrightarrow{v_4}$.

Figure 24:
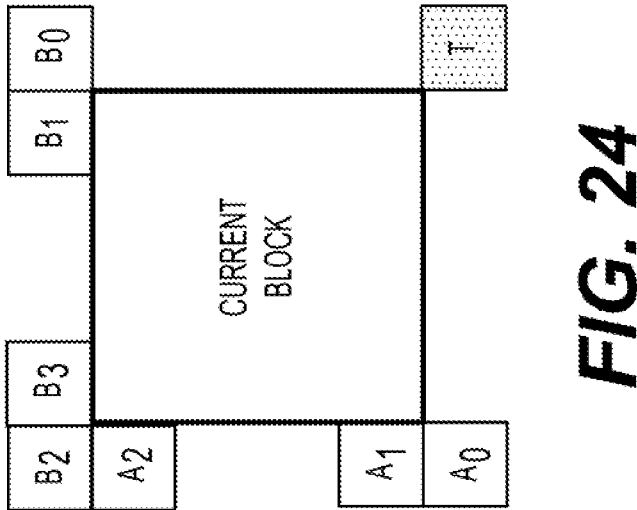
FIG. 24 shows examples of spatial neighbors and a temporal neighbor of a current block.

Constructed affine candidates are constructed by combining neighbor translational motion information of each control point. The motion information for the control points is derived from specified spatial neighbors and temporal neighbor shown in FIG. 24. CPMVk (k=1, 2, 3, 4) represents the k-th control point. For CPMV1, the B2>B3>A2 blocks are checked in order and the MV of the first available block is used. For CPMV2, the B1>B0 blocks are checked and for CPMV3, the A1>A0 blocks are checked. A TMVP at block T is used as CPMV4 if available.

After MVs of four control points are attained, affine merge candidates are constructed based on that motion information. The following combinations of control point MVs are used to construct in order: {CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2}, {CPMV1, CPMV3}.

The combination of 3 CPMVs constructs a 6-parameter affine merge candidate and the combination of 2 CPMVs constructs a 4-parameter affine merge candidate. To avoid a motion scaling process, if the reference indices of control points are different, the related combination of control point MVs is discarded.

After inherited affine merge candidates and constructed affine merge candidates are checked, if the list is still not full, zero MVs are inserted to the end of the merge candidate list.

Figure 25:
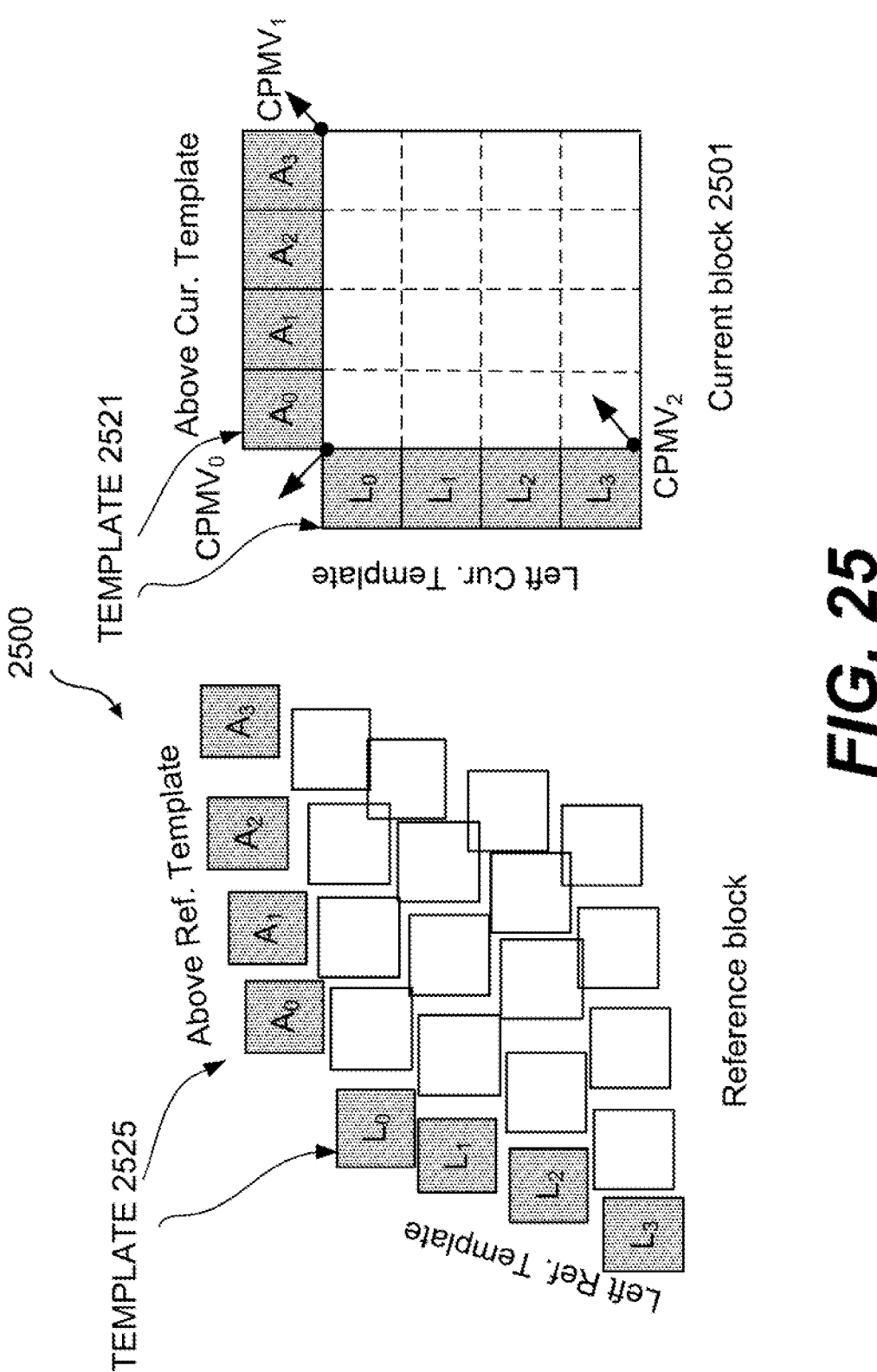
FIG. 25 shows an example of template matching when a current block is coded with an affine mode.

A TM can be applied in an affine mode, such as the affine AMVP mode, the affine merge mode, and can be referred to as an affine TM. FIG. 25 shows an example of TM (2500), such as in an affine merge mode. A template (2521) of a current block (e.g., a current CU) (2501) can include an above current template A0-A3 and a left current template L0-L3. A reference template (2525) of a reference block in a reference picture can include multiple subblock templates (e.g., 4×4 subblocks) that are pointed by control point MV (CPMV)-derived MVs of neighboring subblocks (e.g., A0-A3 and L0-L3 as shown in FIG. 25) at block boundaries.

A search process of the TM that is applied in the affine mode (e.g., the affine merge mode) can start from a CPMV0, while keeping other CPMV(s) (e.g., (i) CPMV1 if a 4-parameter model is used or (ii) CPMV1 and CPMV2 if a 6-parameter model is used) constant. The search can be performed toward a horizontal direction and a vertical direction. In an example, the search is followed by diagonal direction(s) only if a zero vector is not the best difference vector found from the horizontal search and the vertical search. The affine TM can repeat the same search process for the CPMV1. The affine TM can repeat the same search process for CPMV2 if a 6-parameter model is used. Based on the refined CPMVs, the whole search process can restart from the refined CPMV0, if the zero vector is not the best difference vector from the previous iteration and the search process has iterated less than 3 times.

In an example, the subblock merge candidate list that includes the SbTMVP candidates only includes the SbTMVP candidates and does not include affine merge candidates. A separate subblock merge candidate list is used to store affine merge candidate(s).

In an example, the subblock merge candidate list that includes the SbTMVP candidates also includes affine merge candidate(s). In addition to determining the TM costs corresponding to the SbTMVP candidates, TM costs corresponding to the affine merge candidate(s) can be determined. The SbTMVP candidates and the affine merge candidate(s) can be reordered based on the combined TM costs corresponding to the SbTMVP candidates and the affine merge candidate(s). In an example, (i) the TM costs corresponding to the SbTMVP candidates and/or (ii) the TM costs corresponding to the affine merge candidate(s) are modified before reordering the SbTMVP candidates and the affine merge candidate(s).

A candidate (e.g., an SbTMVP candidate or an affine merge candidate) can be selected based on the reordered SbTMVP candidates and affine merge candidate(s). In an example, no index is signaled and the candidate is a candidate corresponding to the smallest TM costs in the combined TM costs. In an example, an index indicates the candidate in the reordered SbTMVP candidates and affine merge candidate(s).

In an example, the subblock merge candidate list includes one SbTMVP candidate and affine merge candidate(s).

In related technologies, multiple collocated pictures are utilized for the SbTMVP mode. The subblock temporal motion information derivation from the multiple collocated pictures is described below.

In an embodiment, the multiple DV candidates described above can be associated with multiple collocated pictures. For example, a reference picture of an MV of each of the multiple DV candidates is one of the multiple collocated pictures. As described above, the SbTMVP candidates include more than one SbTMVP candidate derived from multiple collocated pictures. A subblock merge candidate list including the SbTMVP candidates can be constructed. Motion information of a candidate (e.g., a candidate in the set of predefined candidates described above) may be checked to find an MV with one of the multiple collocated pictures as a reference picture. MVs that are determined using the above method may be used as the multiple DV candidates to derive the respective SbTMVP candidates, as described above.

In an embodiment, candidates (e.g., motion candidates) to be checked to derive the multiple DV candidates are from a subset or the entire set of the set of predefined candidates, as described above.

In an example, the candidates (e.g., the motion candidates) may be checked in a predefined order, and all candidates with MVs pointing to a valid collocated picture (e.g., one of the multiple collocated pictures) may be included in a DV candidate list as a DV candidate.

A pruning process can be used to derive DV candidates in the DV candidate list. For example, the DV candidate list includes a first DV candidate that has a first MV pointing to a first collocated picture in the multiple collocated pictures. A second DV candidate that has the same first MV pointing to the same first collocated picture may not be added to the DV candidate list.

In an embodiment, each of the DV candidate from the DV candidate list is used to derive a SbTMVP candidate, and thus forming a SbTMVP candidate list, such as the subblock merge candidate list described above.

In an example, the SbTMVP candidates in the SbTMVP candidate list are reordered based on TM costs where the TM costs are determined based on embodiments described above, such as in FIGS. 18-19.

In an example, which SbTMVP candidate to be used is signaled by a candidate index in a bitstream, as described above. In another example, the SbTMVP candidate with the lowest TM cost may be used without signaling an index, as described above.

In an embodiment, a neighboring coded block of the current block has bi-prediction MVs. The collocated picture check described above to determine whether one of the bi-prediction MVs (e.g., including a first MV and a second MV) can be one of the multiple DV candidates can be applied to the first MV pointing to in a reference picture in L0, and subsequently can be applied to the second MV pointing to in a reference picture in L1. Alternatively, the collocated picture check can be applied to the second MV, and subsequently can be applied to the first MV.

In an embodiment, if one (e.g., the first MV) of the bi-prediction MVs in the neighboring block points to one of the collocated pictures, the other available MV (e.g., the second MV) pointing to the opposite reference list (e.g., L1) is not checked and not used. In an example, the one (e.g., the first MV) of the bi-prediction MVs is included in the multiple DV candidates.

In an embodiment, the subblock merge candidate list only includes one SbTMVP candidate. Embodiments described in the disclosure such as in FIGS. 18-19 can be applied to each of the collocated pictures and the multiple DV candidates that are associated with the collocated pictures. In an example, the multiple DV candidates can be reordered based on corresponding TM costs determined using the embodiments described in the disclosure. A DV candidate can be selected based on the reordered multiple DV candidates. In an example, the DVA candidate corresponds to the lowest TM cost in the TM costs. In an example, an index is signaled to indicate which DV candidate is selected. The one SbTMVP candidate that corresponds to the selected DV candidate can be included as the one SbTMVP candidate in the subblock merge candidate list.

In an embodiment, the DV candidate derivation method for the multiple collocated pictures may be applied to derive full block based TMVP candidate and generate multiple TMVP candidates. In an example, a plurality of candidates (e.g., candidates from the set of predefined candidates described above) is available to the current block. Referring to FIG. 18, for each candidate (e.g., each motion information candidate) (e.g., the DV 1831) of the plurality of candidates of the current block, whether a reference picture of the candidate is one of the multiple collocated pictures can be determined. If the reference picture of the candidate is the one of the multiple collocated pictures, a collocated block (e.g., 1802) in the one of the multiple collocated pictures can be determined based on the candidate (e.g., the DV 1831) of the current block (e.g., 1801). At least one TMVP candidate can be determined based on motion information of (i) the collocated block or (ii) a neighboring block of the collocated block. In an example, the at least one TMVP candidate is determined based on the motion information of the subblock (2,2) of the collocated block (e.g., (1802)). In an example, the at least one TMVP candidate is determined based on the motion information of a neighboring block (e.g., a bottom-right neighboring block) of the collocated block (e.g., (1802)).

Figure 26:
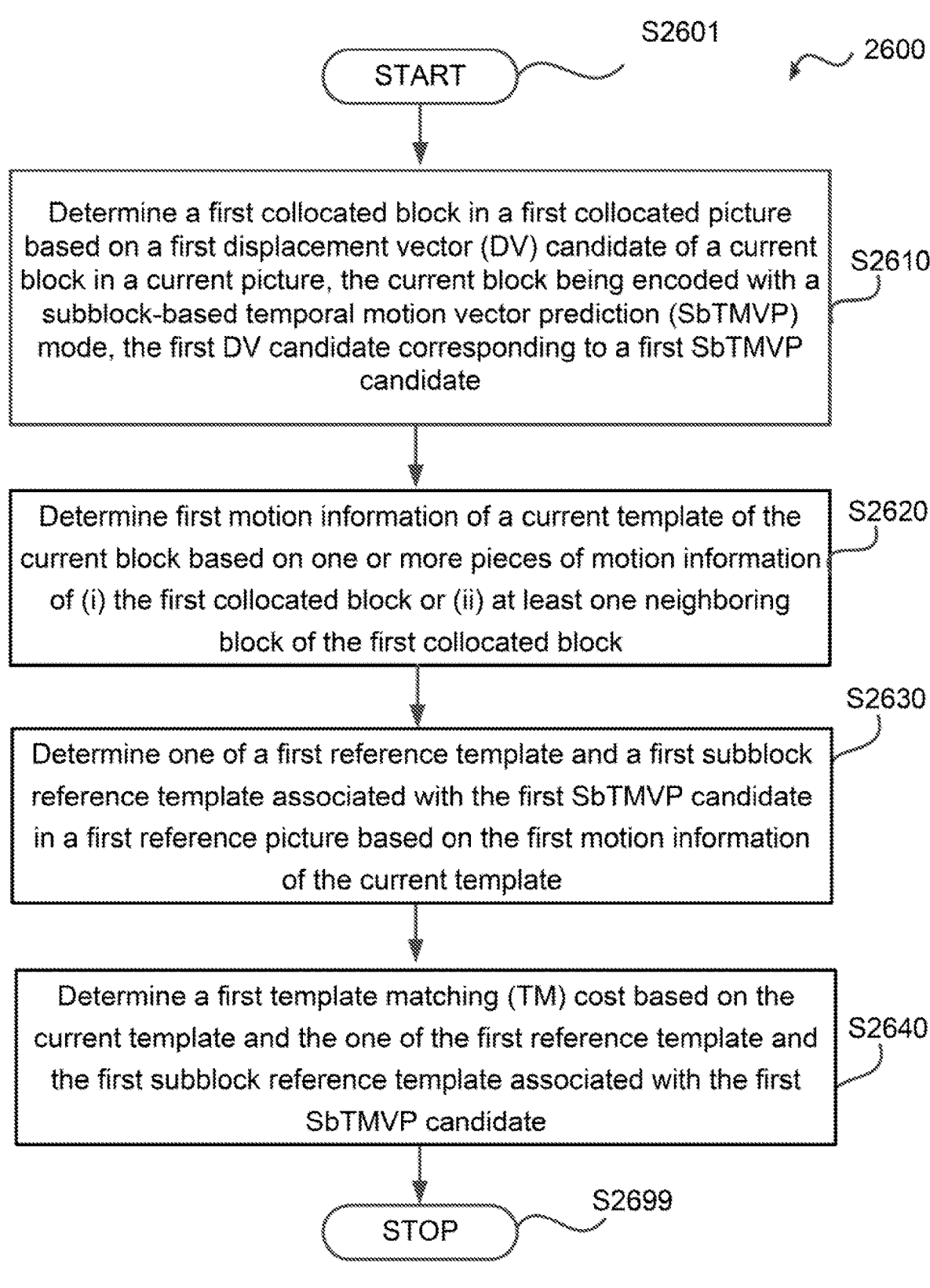
FIG. 26 shows a flow chart outlining an encoding process according to some embodiment of the disclosure.

FIG. 26 shows a flow chart outlining an encoding process (2600) according to an embodiment of the disclosure. The process (2600) can be executed by an apparatus for video/image coding that can include processing circuitry. The processing circuitry in the apparatus, such as the processing circuitry in the terminal devices (310), (320), (330) and (340), processing circuitry that performs functions of a video encoder (e.g., (403), (603), (703)), or the like can be configured to perform the process (2600). In some embodiments, the process (2600) is implemented in software instructions, thus when the processing circuitry executes the software instructions, the processing circuitry performs the process (2600). The process starts at (S2601), and proceeds to (S2610).

At (S2610), a first collocated block in a first collocated picture can be determined based on a first displacement vector (DV) candidate of a current block in a current picture.

The current block can be encoded with a subblock-based temporal motion vector prediction (SbTMVP) mode, and the first DV candidate corresponds to a first SbTMVP candidate.

At (S2620), first motion information of a current template of the current block can be determined based on one or more pieces of motion information of (i) the first collocated block or (ii) at least one neighboring block of the first collocated block.

At (S2630), one of a first reference template and a first subblock reference template associated with the first SbTMVP candidate in a first reference picture can be determined based on the first motion information of the current template. The first reference template and the current template have a same size. A size of the first subblock reference template can be less than a size of the current template.

At (S2640), a first template matching (TM) cost can be determined based on the current template and the one of the first reference template and the first subblock reference template associated with the first SbTMVP candidate.

The process (2600) then proceeds to (S2699), and terminates.

The process (2600) can be suitably adapted to various scenarios and steps in the process (2600) can be adjusted accordingly. One or more of the steps in the process (2600) can be adapted, omitted, repeated, and/or combined. Any suitable order can be used to implement the process (2600). Additional step(s) can be added.

In an embodiment, the one of the first reference template and the first subblock reference template is the first subblock reference template. The current template includes a first subblock template and a second subblock template. The first motion information of the current template includes a first piece of motion information of the first subblock template and a second piece of motion information of the second subblock template that is different from the first piece of motion information. The first piece of motion information of the first subblock template is determined from a first subblock and the second piece of motion information of the second subblock template is determined from a second subblock. The first subblock and the second subblock are different subblocks in (i) the first collocated block or (ii) the at least one neighboring block of the first collocated block. The first subblock reference template is determined based on the first piece of motion information of the first subblock template. A second subblock reference template is determined based on the second piece of motion information of the second subblock template. The second subblock reference template can be in one of the first reference picture and in a second reference picture. A predictor template can be determined based on the first subblock reference template and the second subblock reference template. The TM cost can be determined based on the current template and the predictor template.

In an example, the first piece of motion information of the first subblock template is determined based on motion information of a subblock in the first collocated block where the subblock in the first collocated block is collocated with a subblock in the current block that is adjacent to the first subblock template.

In an example, the first piece of motion information of the first subblock template is determined based on motion information of a subblock in the at least one neighboring block of the first collocated block where the subblock in the at least one neighboring block of the first collocated block is collocated with the first subblock template.

If the first subblock template is above the current block and a width of the first subblock template is a multiple of a width of a subblock in the first collocated block, the first piece of motion information of the first subblock template is determined based on motion information of subblocks in a top row in the first collocated block or subblocks that are above the first collocated block.

If the first subblock template is a left neighbor of the current block and a height of the first subblock template is a multiple of a height of the subblock in the first collocated block, the first piece of motion information of the first subblock template is determined based on motion information of subblocks in a left most column in the first collocated block or subblocks that are left neighbors of the first collocated block.

In an example, the one of the first reference template and the first subblock reference template is the first reference template. The first motion information of the current template is determined as motion information of a center position of the first collocated block at (S2620) and the first reference template associated with the first DV candidate is determined based on the motion information of the center position of the first collocated block.

In an embodiment, DV candidates of the current block include the first DV candidate. A TM process can be performed as below. For each of the DV candidates that is different from the first DV candidate, a collocated block in one of at least one collocated picture can be determined based on the respective DV candidate of the current block. The at least one collocated picture includes the first collocated picture. Motion information of the current template can be determined based on one or more pieces of motion information of (i) the collocated block associated with the respective DV candidate or (ii) at least one neighboring block of the collocated block associated with the respective DV candidate. One of a reference template and a subblock reference template associated with the respective DV candidate in the first reference picture is determined based on the motion information of the current template. The reference template associated with the respective DV candidate and the current template can have a same size. A size of the subblock reference template can be less than the size of the current template. A TM cost can be determined based on the current template and the one of the reference template and the subblock reference template associated with the respective DV candidate. A SbTMVP candidate can be determined based on the TM costs that include the first TM cost. The current block can be encoded based on the determined SbTMVP candidate.

In an example, a respective one of the DV candidates of the current block corresponds to each of SbTMVP candidates of the current block where the SbTMVP candidates include the first SbTMVP candidate. The SbTMVP candidates can be reordered based on the corresponding TM costs, and the SbTMVP candidate can be selected from the reordered SbTMVP candidates.

In an example, the DV candidates include at least one of (i) DV predictors of the current block or (ii) summations of respective DV offsets and one of the DV predictors. An index can be encoded and included in a video/image bitstream to indicate the selected SbTMVP candidate.

In an example, the SbTMVP candidate is selected as one of the reordered SbTMVP candidates that corresponds to the smallest TM cost in the TM costs.

In an embodiment, the first subblock template is bi-predicted and the second subblock template is uni-predicted. The first piece of motion information of the first subblock template includes a motion vector (MV) pointing to the first subblock reference template in the first reference picture and another MV pointing to a first subblock reference template in a second reference picture. The second piece of motion information of the second subblock template includes a MV pointing to the second subblock reference template in the first reference picture. A first predictor subblock template is determined based on the first subblock reference template in the first reference picture and the first subblock reference template in the second reference picture. A second predictor subblock template is determined based on the second subblock reference template in the first reference picture.

In an example, the predictor template is determined based on the first predictor subblock template and the second predictor subblock template.

In an example, a first sub-TM cost is determined based on the first subblock template and the first predictor subblock template, and a second sub-TM cost is determined based on the second subblock template and the second predictor subblock template. The first TM cost is determined based on the first sub-TM cost and the second sub-TM cost.

In an example, the first TM cost is determined based on the first sub-TM cost, the second sub-TM cost, and at least one of (i) a first bias factor that modifies the first sub-TM cost or (ii) a second bias factor that modifies the second sub-TM.

In an embodiment, subblock-based merge candidates include the first SbTMVP candidate and at least one affine merge candidate. The TM process includes: (i) determining at least one TM cost of the at least one affine merge candidate, (ii) reordering the subblock-based merge candidates based on the first TM cost of the first SbTMVP candidate and the at least one TM cost of the at least one affine merge candidate, and (iii) selecting a subblock-based merge candidate from the reordered subblock-based merge candidates. The selected subblock-based merge candidate can be used to encode the current block.

In an embodiment, the at least one collocated picture includes a plurality of collocated pictures and a reference picture of each of the DV candidates is one of the plurality of collocated pictures.

In an example, the DV candidates are determined based on a set of predefined candidates including at least one of (i) a motion vector (MV) of a spatial neighboring block of the current block, (ii) an MV of a spatial neighboring subblock of the current block, (iii) a history-based MV predictor (HMVP), or (iv) a candidate in a merge candidate list that includes at least one of (a) a spatial candidate, (b) a temporal candidate, (c) a HMVP candidate, (d) a pairwise average candidate, or (e) a zero MV.

In an example, the DV candidates are reordered based on the corresponding TM costs. The SbTMVP candidate is determined based on one of the reordered DV candidates that corresponds to the smallest TM cost in the TM costs.

FIG. 27 shows a flow chart outlining a decoding process (2700) according to an embodiment of the disclosure. The process (2700) can be executed by an apparatus for video/image coding that can include receiving circuitry and processing circuitry. The processing circuitry in the apparatus, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like can be configured to perform the process (2700). In some embodiments, the process (2700) is implemented in software instructions, thus when the processing circuitry executes the software instructions, the processing circuitry performs the process (2700). The process starts at (S2701), and proceeds to (S2710).

At (S2710), prediction information of a current block in a current picture can be decoded from a coded video/image bitstream. The prediction information can indicate a sub-block-based temporal motion vector prediction (SbTMVP) mode.

At (S2720), a first collocated block in a first collocated picture can be determined based on a first displacement vector (DV) candidate of the current block. The first DV candidate can correspond to a first SbTMVP candidate.

At (S2730), first motion information of a current template of the current block can be determined based on one or more pieces of motion information of (i) the first collocated block or (ii) at least one neighboring block of the first collocated block.

At (2740), one of a first reference template and a first subblock reference template associated with the first SbTMVP candidate in a first reference picture can be determined based on the first motion information of the current template. The first reference template and the current template can have a same size. A size of the first subblock reference template can be less than a size of the current template.

At (2750), a first template matching (TM) cost can be determined based on the current template and the one of the first reference template and the first subblock reference template associated with the first SbTMVP candidate.

The process (2700) proceeds to (S2799), and terminates.

The process (2700) can be suitably adapted to various scenarios and steps in the process (2700) can be adjusted accordingly. One or more of the steps in the process (2700) can be adapted, omitted, repeated, and/or combined. Any suitable order can be used to implement the process (2700). Additional step(s) can be added.

In an embodiment, the one of the first reference template and the first subblock reference template is the first subblock reference template. The current template includes a first subblock template and a second subblock template. The first motion information of the current template includes a first piece of motion information of the first subblock template and a second piece of motion information of the second subblock template that is different from the first piece of motion information. The first piece of motion information of the first subblock template is determined from a first sub-block and the second piece of motion information of the second subblock template is determined from a second subblock. The first subblock and the second subblock are different subblocks in (i) the first collocated block or (ii) the at least one neighboring block of the first collocated block. The first subblock reference template can be determined based on the first piece of motion information of the first subblock template. A second subblock reference template can be determined based on the second piece of motion information of the second subblock template. The second subblock reference template is in one of the first reference picture and in a second reference picture. A predictor template can be determined based on the first subblock reference template and the second subblock reference template. The TM cost can be determined based on the current template and the predictor template.

In an example, the first piece of motion information of the first subblock template is determined based on motion information of a subblock in the first collocated block where the subblock in the first collocated block is collocated with a subblock in the current block that is adjacent to the first subblock template.

In an example, the first piece of motion information of the first subblock template is determined based on motion information of a subblock in the at least one neighboring block of the first collocated block where the subblock in the at least one neighboring block of the first collocated block is collocated with the first subblock template.

If the first subblock template is above the current block and a width of the first subblock template is a multiple of a width of a subblock in the first collocated block, the first piece of motion information of the first subblock template is determined based on motion information of subblocks in a top row in the first collocated block or subblocks that are above the first collocated block.

If the first subblock template is a left neighbor of the current block and a height of the first subblock template is a multiple of a height of the subblock in the first collocated block, the first piece of motion information of the first subblock template is determined based on motion information of subblocks in a left most column in the first collocated block or subblocks that are left neighbors of the first collocated block.

In an example, the one of the first reference template and the first subblock reference template is the first reference template. The first motion information of the current template is determined as motion information of a center position of the first collocated block at (S2730) and the first reference template associated with the first DV candidate is determined based on the motion information of the center position of the first collocated block.

In an embodiment, DV candidates of the current block include the first DV candidate. A TM process can be performed as below. For each of the DV candidates that is different from the first DV candidate, a collocated block in one of at least one collocated picture can be determined based on the respective DV candidate of the current block. The at least one collocated picture includes the first collocated picture. Motion information of the current template can be determined based on one or more pieces of motion information of (i) the collocated block associated with the respective DV candidate or (ii) at least one neighboring block of the collocated block associated with the respective DV candidate. One of a reference template and a subblock reference template associated with the respective DV candidate in the first reference picture is determined based on the motion information of the current template. The reference template associated with the respective DV candidate and the current template can have a same size. A size of the subblock reference template can be less than the size of the current template. A TM cost can be determined based on the current template and the one of the reference template and the subblock reference template associated with the respective DV candidate. A SbTMVP candidate can be determined based on the TM costs that include the first TM cost. The current block can be reconstructed based on the determined SbTMVP candidate.

In an example, a respective one of the DV candidates of the current block corresponds to each of SbTMVP candidates of the current block where the SbTMVP candidates include the first SbTMVP candidate. The SbTMVP candidates can be reordered based on the corresponding TM costs, and the SbTMVP candidate can be selected from the reordered SbTMVP candidates.

In an example, the DV candidates include at least one of (i) DV predictors of the current block or (ii) summations of respective DV offsets and one of the DV predictors. The SbTMVP candidate is selected based on an index signaled in the coded video/image bitstream.

In an example, the SbTMVP candidate is selected as one of the reordered SbTMVP candidates that corresponds to the smallest TM cost in the TM costs.

In an embodiment, the first subblock template is bi-predicted and the second subblock template is uni-predicted. The first piece of motion information of the first subblock template includes a motion vector (MV) pointing to the first subblock reference template in the first reference picture and another MV pointing to a first subblock reference template in a second reference picture. The second piece of motion information of the second subblock template includes a MV pointing to the second subblock reference template in the first reference picture. A first predictor subblock template is determined based on the first subblock reference template in the first reference picture e and the first subblock reference template in the second reference picture. A second predictor subblock template is determined based on the second subblock reference template in the first reference picture.

In an example, the predictor template is determined based on the first predictor subblock template and the second predictor subblock template.

In an example, a first sub-TM cost is determined based on the first subblock template and the first predictor subblock template, and a second sub-TM cost is determined based on the second subblock template and the second predictor subblock template. The first TM cost is determined based on the first sub-TM cost and the second sub-TM cost.

In an example, the first TM cost is determined based on the first sub-TM cost, the second sub-TM cost, and at least one of (i) a first bias factor that modifies the first sub-TM cost or (ii) a second bias factor that modifies the second sub-TM.

In an embodiment, subblock-based merge candidates include the first SbTMVP candidate and at least one affine merge candidate. The TM process includes: (i) determining at least one TM cost of the at least one affine merge candidate, (ii) reordering the subblock-based merge candidates based on the first TM cost of the first SbTMVP candidate and the at least one TM cost of the at least one affine merge candidate, and (iii) selecting a subblock-based merge candidate from the reordered subblock-based merge candidates. The selected subblock-based merge candidate can be used to reconstruct the current block.

In an embodiment, the at least one collocated picture includes a plurality of collocated pictures and a reference picture of each of the DV candidates is one of the plurality of collocated pictures.

In an example, the DV candidates are determined based on a set of predefined candidates including at least one of (i) a motion vector (MV) of a spatial neighboring block of the current block, (ii) an MV of a spatial neighboring subblock of the current block, (iii) a history-based MV predictor (HMVP), or (iv) a candidate in a merge candidate list that includes at least one of (a) a spatial candidate, (b) a temporal candidate, (c) a HMVP candidate, (d) a pairwise average candidate, or (e) a zero MV.

In an example, the DV candidates are reordered based on the corresponding TM costs. The SbTMVP candidate is determined based on one of the reordered DV candidates that corresponds to the smallest TM cost in the TM costs.

FIG. 28 shows a flow chart outlining a decoding process (2800) according to an embodiment of the disclosure. The process (2800) can be executed by an apparatus for video/image coding that can include receiving circuitry and processing circuitry. The processing circuitry in the apparatus, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like can be configured to perform the process (2800). In some embodiments, the process (2800) is implemented in software instructions, thus when the processing circuitry executes the software instructions, the processing circuitry performs the process (2800). The process starts at (S2801), and proceeds to (S2810).

At (S2810), prediction information of a current block in a current picture can be decoded from a coded video/image bitstream. The prediction information can indicate an inter prediction and a plurality of collocated pictures for the current block.

At (S2820), whether a reference picture of the motion information candidate is a respective one of the plurality of collocated pictures is determined for each motion information candidate of a plurality of candidates of the current block.

At (2830), for each motion information candidate of the plurality of candidates of the current block, if the reference picture of the motion information candidate is the one of the plurality of collocated pictures, a collocated block in the one of the plurality of collocated pictures can be determined based on the motion information candidate of the current block. At least one temporal motion vector prediction (TMVP) candidate can be determined based on motion information of (i) the collocated block or (ii) a neighboring block of the collocated block. The motion information can include one motion vector (MV) for uni-prediction and two MVs for bi-prediction. A candidate list for the current block can be constructed based on the at least one TMVP candidate.

The process (2800) proceeds to (S2899), and terminates.

The process (2800) can be suitably adapted to various scenarios and steps in the process (2800) can be adjusted accordingly. One or more of the steps in the process (2800) can be adapted, omitted, repeated, and/or combined. Any suitable order can be used to implement the process (2800). Additional step(s) can be added.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 29 shows a computer system (2900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 29:
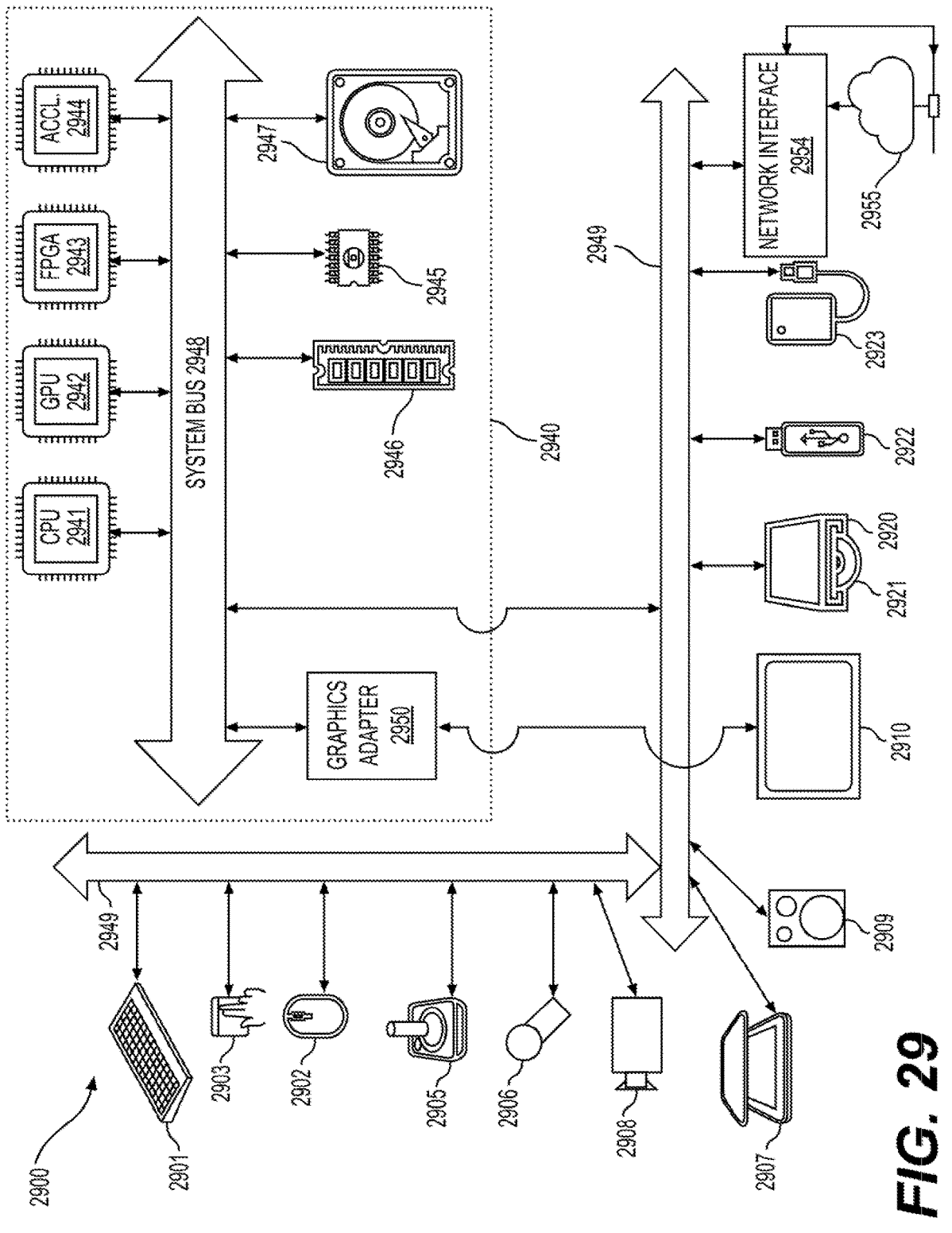
FIG. 29 is a schematic illustration of a computer system in accordance with an embodiment.

The components shown in FIG. 29 for computer system (2900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2900).

Computer system (2900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2901), mouse (2902), trackpad (2903), touch screen (2910), data-glove (not shown), joystick (2905), microphone (2906), scanner (2907), camera (2908).

Computer system (2900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2910), data-glove (not shown), or joystick (2905), but there can also be tactile feedback devices that do not serve as input devices), audio output devices (such as: speakers (2909), headphones (not depicted)), visual output devices (such as screens (2910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2900) can also include human accessible storage devices and their associated media such as optical media including CD/DVD ROM/RW (2920) with CD/DVD or the like media (2921), thumb-drive (2922), removable hard drive or solid state drive (2923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2900) can also include an interface (2954) to one or more communication networks (2955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2949) (such as, for example USB ports of the computer system (2900)); others are commonly integrated into the core of the computer system (2900) by attachment to a system bus as described below (for example Ethernet interface into a PC computer system or cellular network interface into a smartphone computer system). Using any of these networks, computer system (2900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2940) of the computer system (2900).

The core (2940) can include one or more Central Processing Units (CPU) (2941), Graphics Processing Units (GPU) (2942), specialized programmable processing units in the form of Field Programmable Gate Areas (FPGA) (2943), hardware accelerators for certain tasks (2944), graphics adapters (2950), and so forth. These devices, along with Read-only memory (ROM) (2945), Random-access memory (2946), internal mass storage such as internal non-user accessible hard drives, SSDs, and the like (2947), may be connected through a system bus (2948). In some computer systems, the system bus (2948) can be accessible in the form of one or more physical plugs to enable extensions by additional CPUs, GPU, and the like. The peripheral devices can be attached either directly to the core's system bus (2948), or through a peripheral bus (2949). In an example, the screen (2910) can be connected to the graphics adapter (2950). Architectures for a peripheral bus include PCI, USB, and the like.

CPUs (2941), GPUs (2942), FPGAs (2943), and accelerators (2944) can execute certain instructions that, in combination, can make up the aforementioned computer code. That computer code can be stored in ROM (2945) or RAM (2946). Transitional data can be also be stored in RAM (2946), whereas permanent data can be stored for example, in the internal mass storage (2947). Fast storage and retrieve to any of the memory devices can be enabled through the use of cache memory, that can be closely associated with one or more CPU (2941), GPU (2942), mass storage (2947), ROM (2945), RAM (2946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2900), and specifically the core (2940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2940) that are of non-transitory nature, such as core-internal mass storage (2947) or ROM (2945). The software implementing various embodiments of the present disclosure can be stored in such devices and executed by core (2940). A computer-readable medium can include one or more memory devices or chips, according to particular needs. The software can cause the core (2940) and specifically the processors therein (including CPU, GPU, FPGA, and the like) to execute particular processes or particular parts of particular processes described herein, including defining data structures stored in RAM (2946) and modifying such data structures according to the processes defined by the software. In addition or as an alternative, the computer system can provide functionality as a result of logic hardwired or otherwise embodied in a circuit (for example: accelerator (2944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
JVET: Joint Video Exploration Team
AMVR: Adaptive Motion Vector Resolution
POC: Picture Order Count SbTMVP: Subblock-based temporal motion vector prediction While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of decoding, comprising:

decoding prediction information of a current block in a current picture from a coded bitstream, the prediction information indicating a subblock-based temporal motion vector prediction (SbTMVP) mode; and performing template matching (TM) by determining a first collocated block in a first collocated picture based on a first motion shift candidate of the current block;

determining first motion information of a current template of the current block based on one or more pieces of motion information of the first collocated block, the first motion information of the current template indicating one of a first reference template and a first subblock reference template in a first reference picture relative to the current template that is in the current picture;

determining the one of the first reference template and the first subblock reference template associated with the first motion shift candidate based on the first motion information of the current template; and determining a first TM cost based on the current template and the one of the first reference template and the first subblock reference template.

2. The method of claim 1, wherein motion shift candidates of the current block include the first motion shift candidate; and the performing the TM includes performing the TM by for each of the motion shift candidates that is different from the first motion shift candidate, determining a collocated block in one of at least one collocated picture based on the respective motion shift candidate of the current block, the at least one collocated picture including the first collocated picture;

determining motion information of the current template based on one or more pieces of motion information of the collocated block associated with the respective motion shift candidate;

determining one of a reference template and a subblock reference template in a reference picture based on the motion information of the current template; and determining a TM cost based on the current template and the one of the reference template and the subblock reference template associated with the respective motion shift candidate; and determining a motion shift candidate to be used in the SbTMVP mode based on the TM costs that include the first TM cost; and the method further includes:

determining an SbTMVP candidate based on the determined motion shift candidate, a respective one of the motion shift candidates of the current block corresponding to each of SbTMVP candidates of the current block; and reconstructing the current block based on the determined SbTMVP candidate.

3. The method of claim 1, wherein the one of the first reference template and the first subblock reference template is the first reference template;

the determining the first motion information of the current template includes determining the first motion information of the current template as motion information of a center position of the first collocated block; and the determining the first reference template includes determining the first reference template associated with the first motion shift candidate based on the motion information of the center position of the first collocated block.

4. The method of claim 1, wherein the one of the first reference template and the first subblock reference template is the first subblock reference template;

the current template includes a first subblock template and a second subblock template;

the first motion information of the current template includes a first piece of motion information of the first subblock template and a second piece of motion information of the second subblock template that is different from the first piece of motion information;

the determining the first motion information of the current template includes determining the first piece of motion information of the first subblock template from a first subblock and determining the second piece of motion information of the second subblock template from a second subblock, the first subblock and the second subblock being different subblocks in the first collocated block;

the method further includes:

determining the first subblock reference template in the first reference picture based on the first piece of motion information of the first subblock template;

determining a second subblock reference template based on the second piece of motion information of the second subblock template, the second subblock reference template being in one of the first reference picture and in a second reference picture; and determining a predictor template based on the first subblock reference template in the first reference picture and the second subblock reference template; and the determining the first TM cost includes determining the first TM cost based on the current template and the predictor template.

5. The method of claim 4, wherein the determining the first piece of motion information of the first subblock template comprises:

determining the first piece of motion information of the first subblock template based on motion information of the first subblock in the first collocated block, the first subblock in the first collocated block being collocated with a subblock in the current block that is adjacent to the first subblock template.

6. The method of claim 4, wherein the first piece of motion information of the first subblock template includes a first motion vector (MV) pointing to the first subblock reference template in the first reference picture and a second MV pointing to a first subblock reference template in the second reference picture; and the determining the first subblock reference template in the first reference picture includes determining the first subblock reference template in the first reference picture based on the first MV;

the method includes determining the first subblock reference template in the second reference picture based on the second MV;

the determining the predictor template includes determining a first predictor subblock template using bi-prediction that is based on the first subblock reference template in the first reference picture and the first subblock reference template in the second reference picture.

7. The method of claim 4, wherein the second subblock template is predicted using uni-prediction;

the second piece of motion information of the second subblock template includes a MV pointing to the second subblock reference template in the first reference picture; and the determining the predictor template includes determining a second predictor subblock template using uni-prediction that is based on the second subblock reference template in the first reference picture.

8. The method of claim 4, wherein the first subblock template is predicted using bi-prediction and the second subblock template is predicted using uni-prediction;

the first piece of motion information of the first subblock template includes a first motion vector (MV) pointing to the first subblock reference template in the first reference picture and a second MV pointing to a first subblock reference template in a second reference picture;

the second piece of motion information of the second subblock template includes an MV pointing to the second subblock reference template in the first reference picture; and the determining the predictor template includes:

determining a first predictor subblock template using the bi-prediction that is based on the first subblock reference template in the first reference picture and the first subblock reference template in the second reference picture; and determining a second predictor subblock template using the uni-prediction that is based on the second subblock reference template in the first reference picture.

9. The method of claim 8, wherein the determining the predictor template comprises:

determining the predictor template based on the first predictor subblock template and the second predictor subblock template.

10. The method of claim 8, wherein the determining the first TM cost comprises:

determining a first sub-TM cost based on the first subblock template and the first predictor subblock template;

determining a second sub-TM cost based on the second subblock template and the second predictor subblock template; and determining the first TM cost based on the first sub-TM cost and the second sub-TM cost.

11. The method of claim 4, wherein the determining the first motion information of the current template of the first subblock template comprises:

when the first subblock template is above the current block, determining the first piece of motion information of the first subblock template based on motion information of subblocks in a top row in the first collocated block; and when the first subblock template is a left neighbor of the current block, determining the first piece of motion information of the first subblock template based on motion information of subblocks in a left most column in the first collocated block.

12. The method of claim 2, wherein the determining the motion shift candidate comprises:

reordering the motion shift candidates based on the corresponding TM costs; and selecting the motion shift candidate from the reordered motion shift candidates.

13. The method of claim 12, wherein the selecting the motion shift candidate comprises:

selecting the motion shift candidate as one of the reordered motion shift candidates that corresponds to the smallest TM cost in the TM costs.

14. The method of claim 2, wherein the at least one collocated picture includes a plurality of collocated pictures; and a reference picture of each of the motion shift candidates is one of the plurality of collocated pictures.

15. The method of claim 14, further comprising:

determining the motion shift candidates based on a set of candidates including at least one of (i) a motion vector (MV) of a spatial neighboring block of the current block, (ii) an MV of a spatial neighboring subblock of the current block, (iii) a history-based MV predictor (HMVP), or (iv) a candidate in a merge candidate list that includes at least one of (a) a spatial candidate, (b) a temporal candidate, (c) a HMVP candidate, (d) a pairwise average candidate, or (e) a zero MV.

16. A method of encoding, comprising:

performing template matching (TM) by determining a first collocated block in a first collocated picture based on a first motion shift candidate of a current block in a current picture, the current block being encoded using a subblock-based temporal motion vector prediction (SbTMVP) mode;

determining first motion information of a current template of the current block based on one or more pieces of motion information of the first collocated block, the first motion information of the current template indicating one of a first reference template and a first subblock reference template in a first reference picture relative to the current template that is in the current picture;

determining the one of the first reference template and the first subblock reference template associated with the first motion shift candidate based on the first motion information of the current template; and determining a first TM cost based on the current template and the one of the first reference template and the first subblock reference template.

17. The method of claim 16, wherein motion shift candidates of the current block include the first motion shift candidate; and the performing the TM includes performing the TM by
for each of the motion shift candidates that is different from the first motion shift candidate, determining a collocated block in one of at least one collocated picture based on the respective motion shift candidate of the current block, the at least one collocated picture including the first collocated picture;

determining motion information of the current template based on one or more pieces of motion information of the collocated block associated with the respective motion shift candidate;

determining one of a reference template and a subblock reference template in a reference picture based on the motion information of the current template; and determining a TM cost based on the current template and the one of the reference template and the subblock reference template associated with the respective motion shift candidate; and determining a motion shift candidate to be used in the SbTMVP mode based on the TM costs that include the first TM cost; and the method further includes:

determining an SbTMVP candidate based on the determined motion shift candidate, a respective one of the motion shift candidates of the current block corresponding to each of SbTMVP candidates of the current block; and encoding the current block based on the determined SbTMVP candidate.

18. The method of claim 16, wherein the one of the first reference template and the first subblock reference template is the first reference template;

the determining the first motion information of the current template includes determining the first motion information of the current template as motion information of a center position of the first collocated block; and the determining the first reference template includes determining the first reference template associated with the first motion shift candidate based on the motion information of the center position of the first collocated block.

19. The method of claim 16, wherein the one of the first reference template and the first subblock reference template is the first subblock reference template;

the current template includes a first subblock template and a second subblock template;

the first motion information of the current template includes a first piece of motion information of the first subblock template and a second piece of motion information of the second subblock template that is different from the first piece of motion information;

the determining the first motion information of the current template includes determining the first piece of motion information of the first subblock template from a first subblock and determining the second piece of motion information of the second subblock template from a second subblock, the first subblock and the second subblock being different subblocks in the first collocated block;

the method further includes:

determining the first subblock reference template in the first reference picture based on the first piece of motion information of the first subblock template;

determining a second subblock reference template based on the second piece of motion information of the second subblock template, the second subblock reference template being in one of the first reference picture and in a second reference picture; and determining a predictor template based on the first subblock reference template in the first reference picture and the second subblock reference template; and the determining the first TM cost includes determining the first TM cost based on the current template and the predictor template.

20. A method of processing visual media data, the method comprising:

processing a bitstream of the visual media data according to a format rule, wherein the bitstream includes prediction information of a current block in a current picture from the bitstream, the prediction information indicating a subblock-based temporal motion vector prediction (SbTMVP) mode, and the format rule specifies that template matching (TM) is performed by determining a first collocated block in a first collocated picture based on a first motion shift candidate of the current block;

determining first motion information of a current template of the current block based on one or more pieces of motion information of the first collocated block, the first motion information of the current template indicating one of a first reference template and a first subblock reference template in a first reference picture relative to the current template that is in the current picture;

determining the one of the first reference template and the first subblock reference template associated with the first motion shift candidate based on the first motion information of the current template; and determining a first TM cost based on the current template and the one of the first reference template and the first subblock reference template.

* * * * *